United States Patent
Kubota et al.

(10) Patent No.: US 12,436,282 B2
(45) Date of Patent: Oct. 7, 2025

(54) DISTANCE MEASURING DEVICE

(71) Applicant: KABUSHIKI KAISHA TOSHIBA, Tokyo (JP)

(72) Inventors: Hiroshi Kubota, Yokohama Kanagawa (JP); Nobu Matsumoto, Ebina Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1073 days.

(21) Appl. No.: 17/446,611

(22) Filed: Aug. 31, 2021

(65) Prior Publication Data
US 2022/0091262 A1  Mar. 24, 2022

(30) Foreign Application Priority Data
Sep. 18, 2020 (JP) ................ 2020-157620

(51) Int. Cl.
| | | |
|---|---|---|
| *G01S 17/10* | (2020.01) | |
| *G01S 7/481* | (2006.01) | |
| *G01S 7/4865* | (2020.01) | |
| *G01S 7/487* | (2006.01) | |
| *G01S 17/42* | (2006.01) | |
| *G01S 17/894* | (2020.01) | |
| *G01S 17/931* | (2020.01) | |

(52) U.S. Cl.
CPC ............ *G01S 17/10* (2013.01); *G01S 7/4865* (2013.01); *G01S 7/487* (2013.01); *G01S 17/42* (2013.01); *G01S 17/931* (2020.01)

(58) Field of Classification Search
CPC ........ G01S 17/10; G01S 7/4865; G01S 7/487; G01S 17/42; G01S 17/931; G01S 7/4817; G01S 17/894
See application file for complete search history.

(56) References Cited

U.S. PATENT DOCUMENTS

| | | |
|---|---|---|
| 10,473,785 B2 | 11/2019 | Kubota et al. |
| 2017/0363740 A1 | 12/2017 | Kubota et al. |
| 2019/0086541 A1 | 3/2019 | Kubota et al. |
| 2019/0086542 A1* | 3/2019 | Kubota ............... G01S 7/4863 |
| 2019/0113385 A1* | 4/2019 | Fukuchi ............... H04N 25/772 |
| 2019/0154812 A1* | 5/2019 | Meng ................... G01S 7/4863 |
| 2019/0317213 A1 | 10/2019 | Kubota et al. |
| 2020/0088853 A1 | 3/2020 | Kubota et al. |

(Continued)

FOREIGN PATENT DOCUMENTS

| | | |
|---|---|---|
| JP | 2010-078364 A | 4/2010 |
| JP | 2017-173207 A | 9/2017 |

(Continued)

*Primary Examiner* — Yuqing Xiao
*Assistant Examiner* — Robert W Vasquez
(74) *Attorney, Agent, or Firm* — Finnegan, Henderson, Farabow, Garrett & Dunner, LLP

(57) ABSTRACT

A distance measuring device according to one embodiment includes a light emitter, a light receiver, and a measurement section. The measurement section is configured to: generate a weighted value based on a degree of similarity of values of first and second portions, or a degree of similarity of values of first and second bottom portions; generate a third digital signal obtained by adding the second digital signal to the first digital signal based on the weighted value; and calculate a distance value from an object based on a position of a third portion.

15 Claims, 25 Drawing Sheets

(56) References Cited

U.S. PATENT DOCUMENTS

| | | |
|---|---|---|
| 2020/0132817 A1 | 4/2020 | Ueno et al. |
| 2020/0292677 A1 | 9/2020 | Kubota et al. |
| 2021/0026012 A1 | 1/2021 | Kubota et al. |
| 2021/0063575 A1 | 3/2021 | Kubota et al. |
| 2022/0082671 A1 | 3/2022 | Kubota et al. |
| 2022/0082694 A1 | 3/2022 | Kubota et al. |

FOREIGN PATENT DOCUMENTS

| | | |
|---|---|---|
| JP | 2018-25442 A | 2/2018 |
| JP | 2019-7950 A | 1/2019 |
| JP | 2019-52978 A | 4/2019 |
| JP | 2019-184545 A | 10/2019 |
| JP | 2022-47025 A | 3/2022 |
| JP | 2022-50239 A | 3/2022 |

* cited by examiner

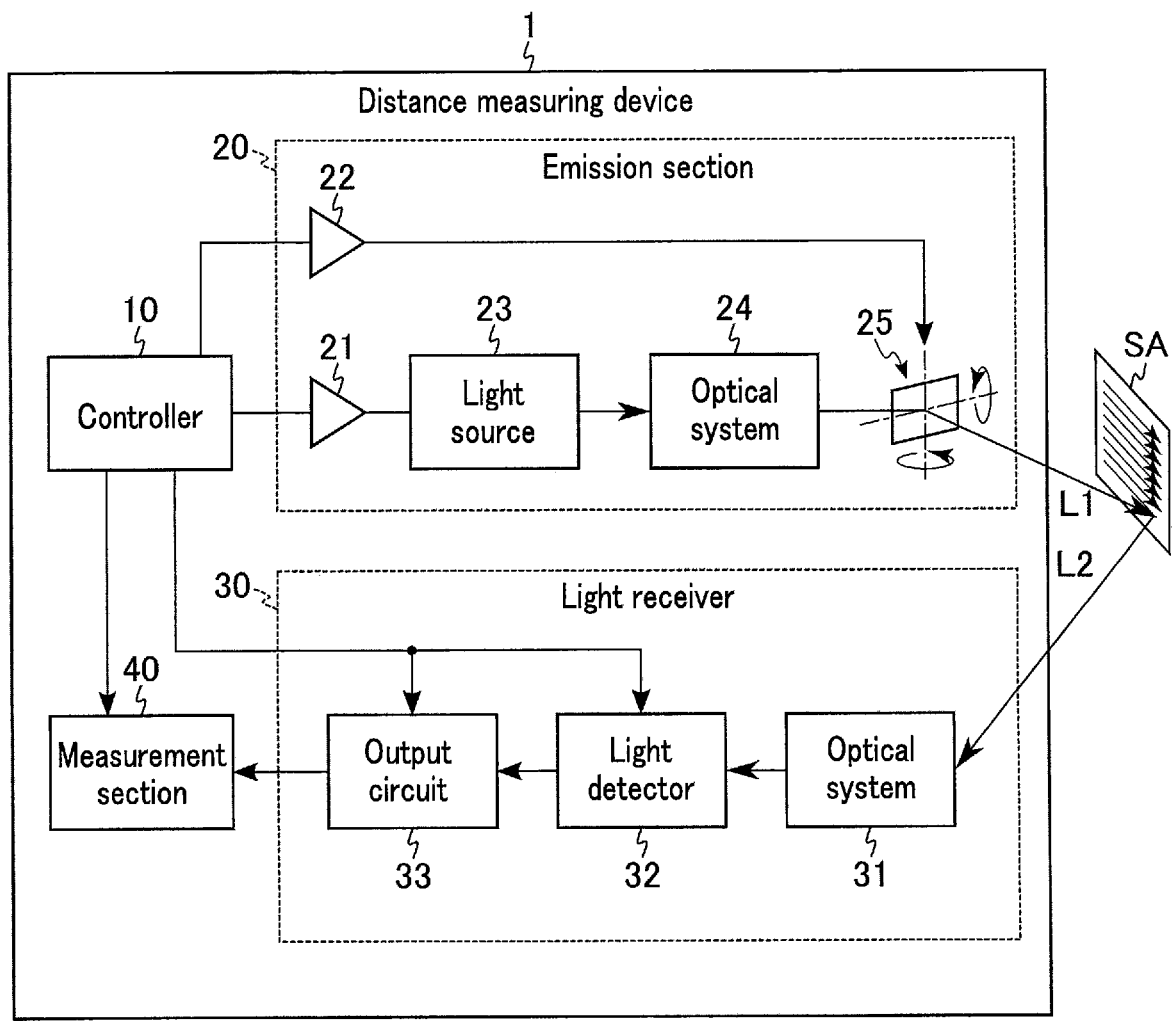
F I G. 3

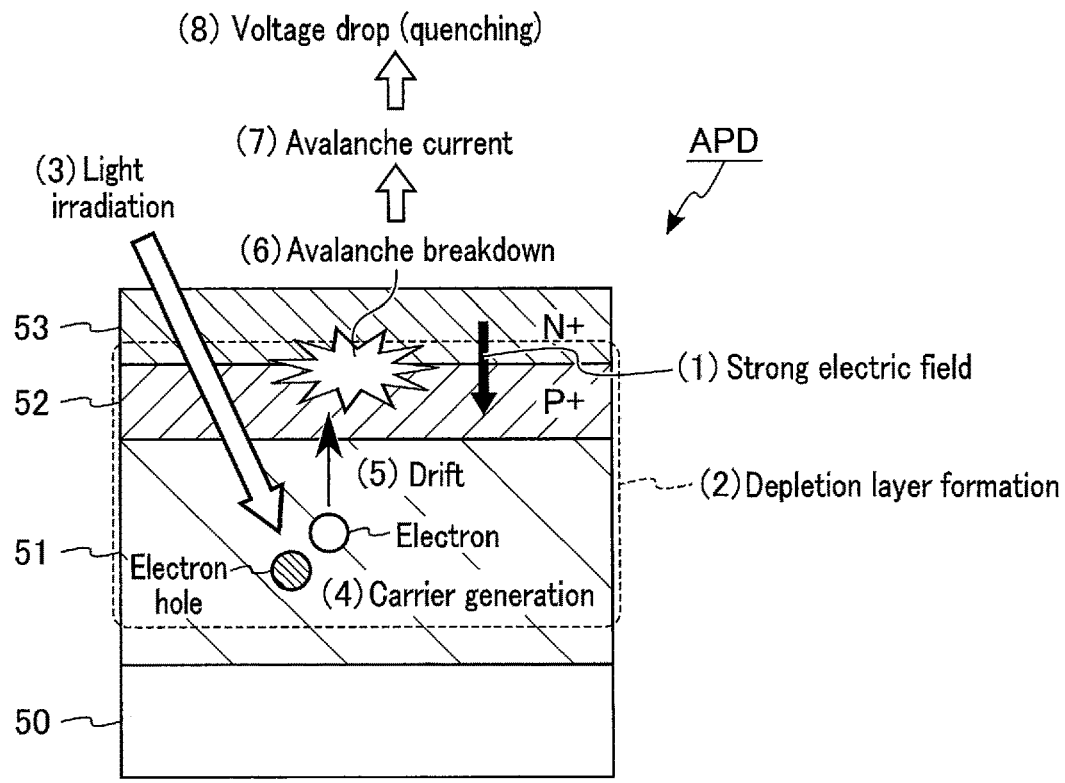
F I G. 6
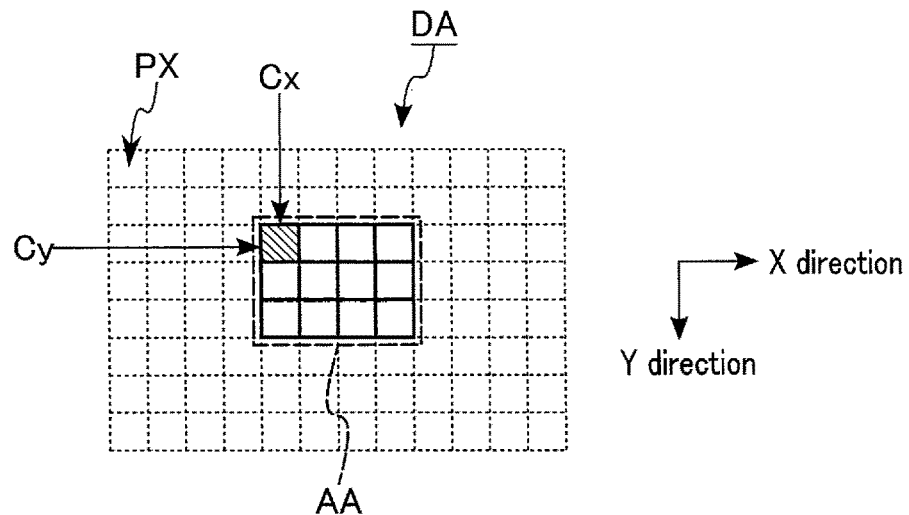
F I G. 7

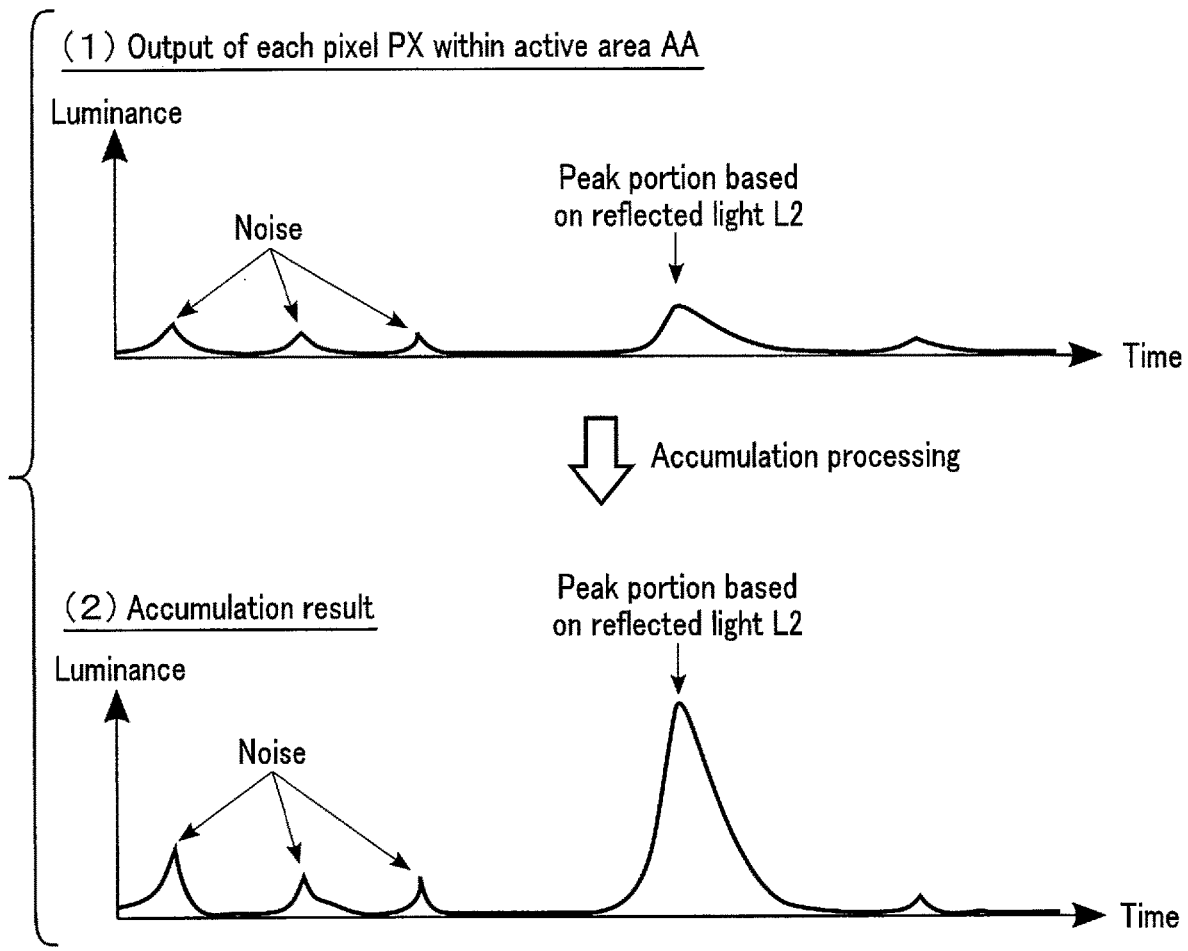
F I G. 12

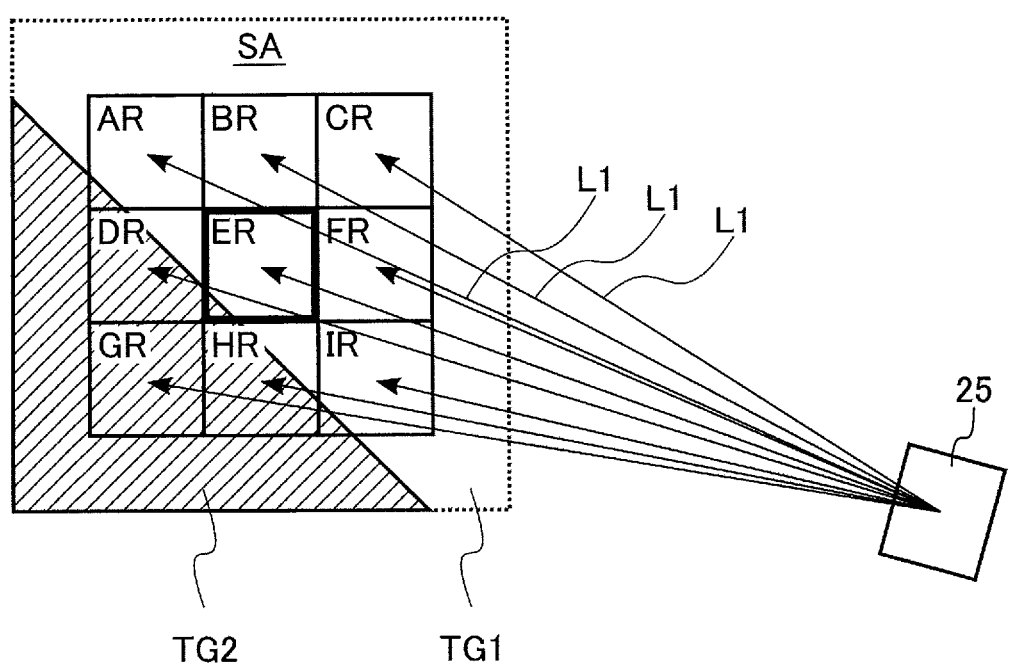
F I G. 13

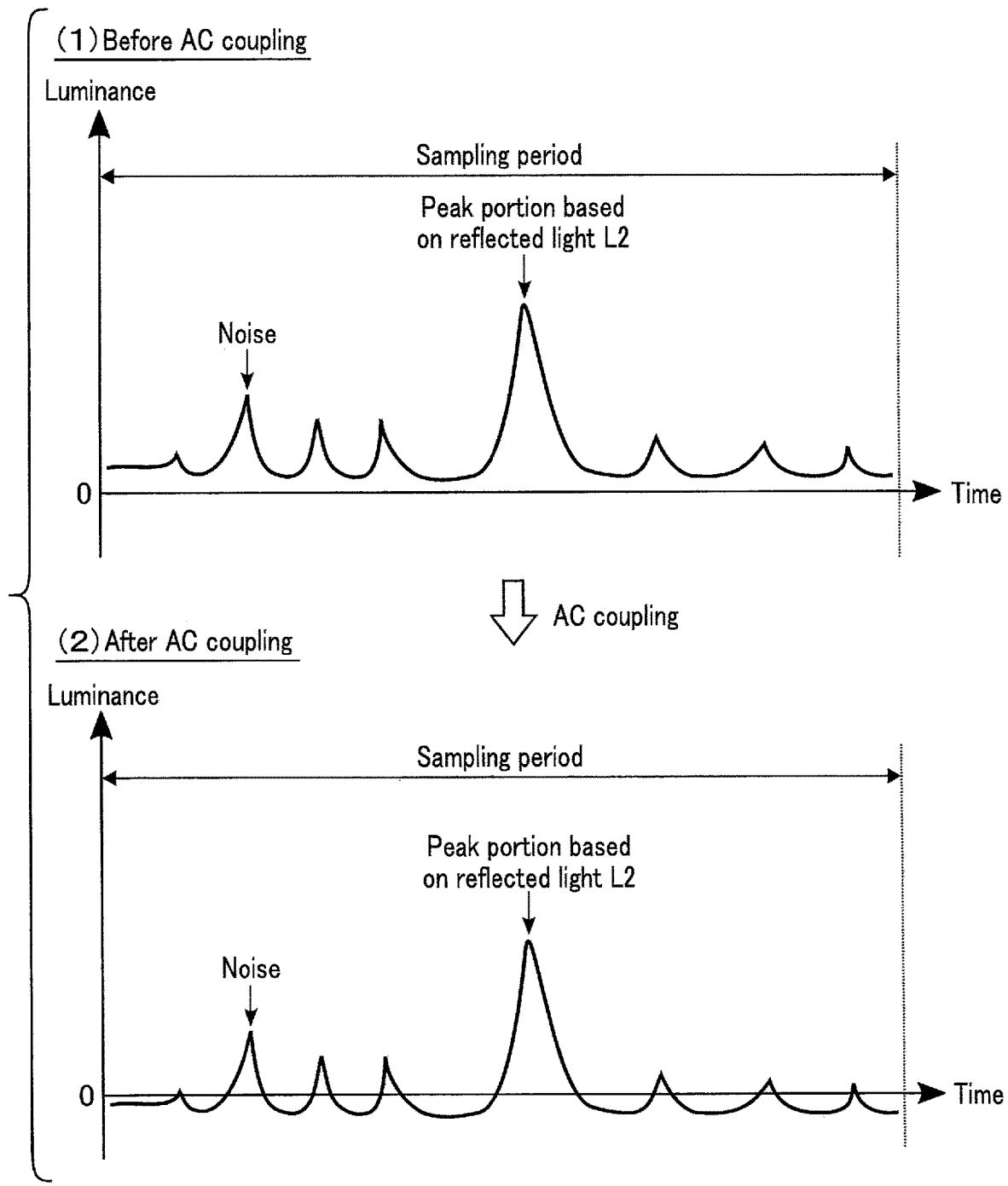
F I G. 20

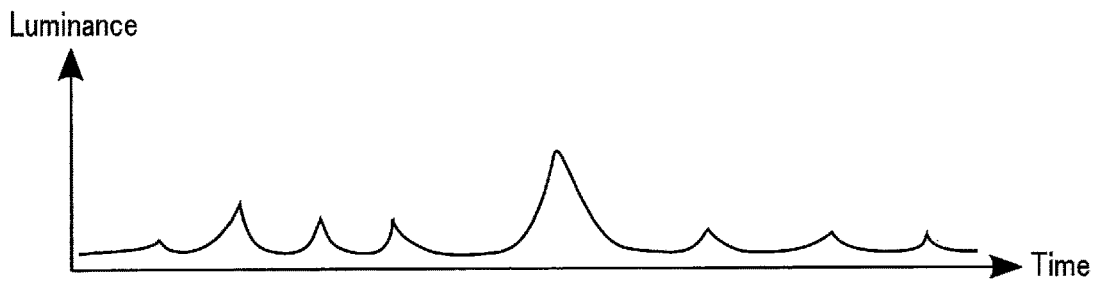
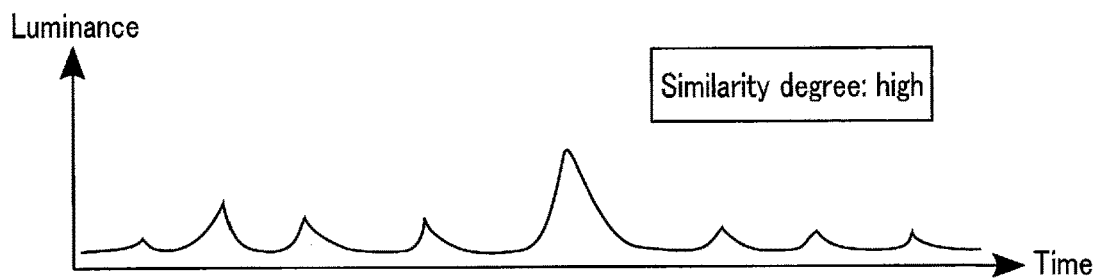
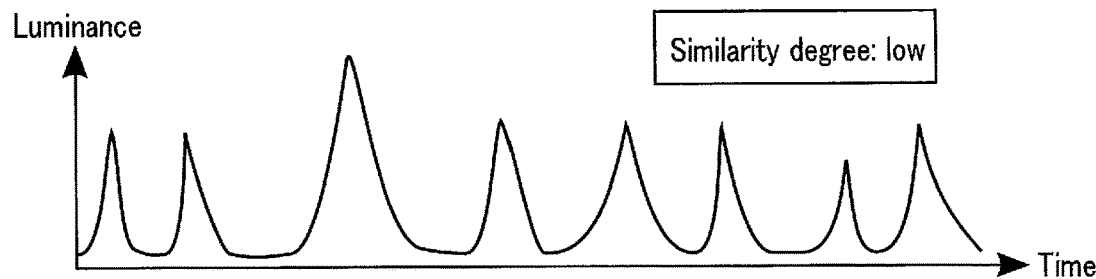
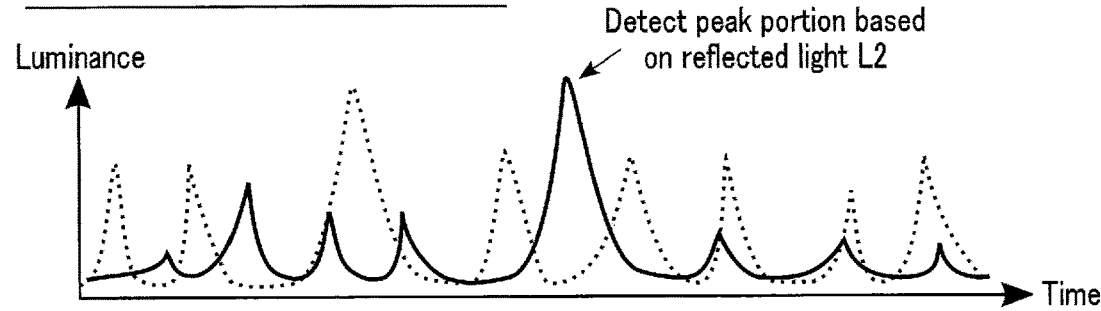
F I G. 23

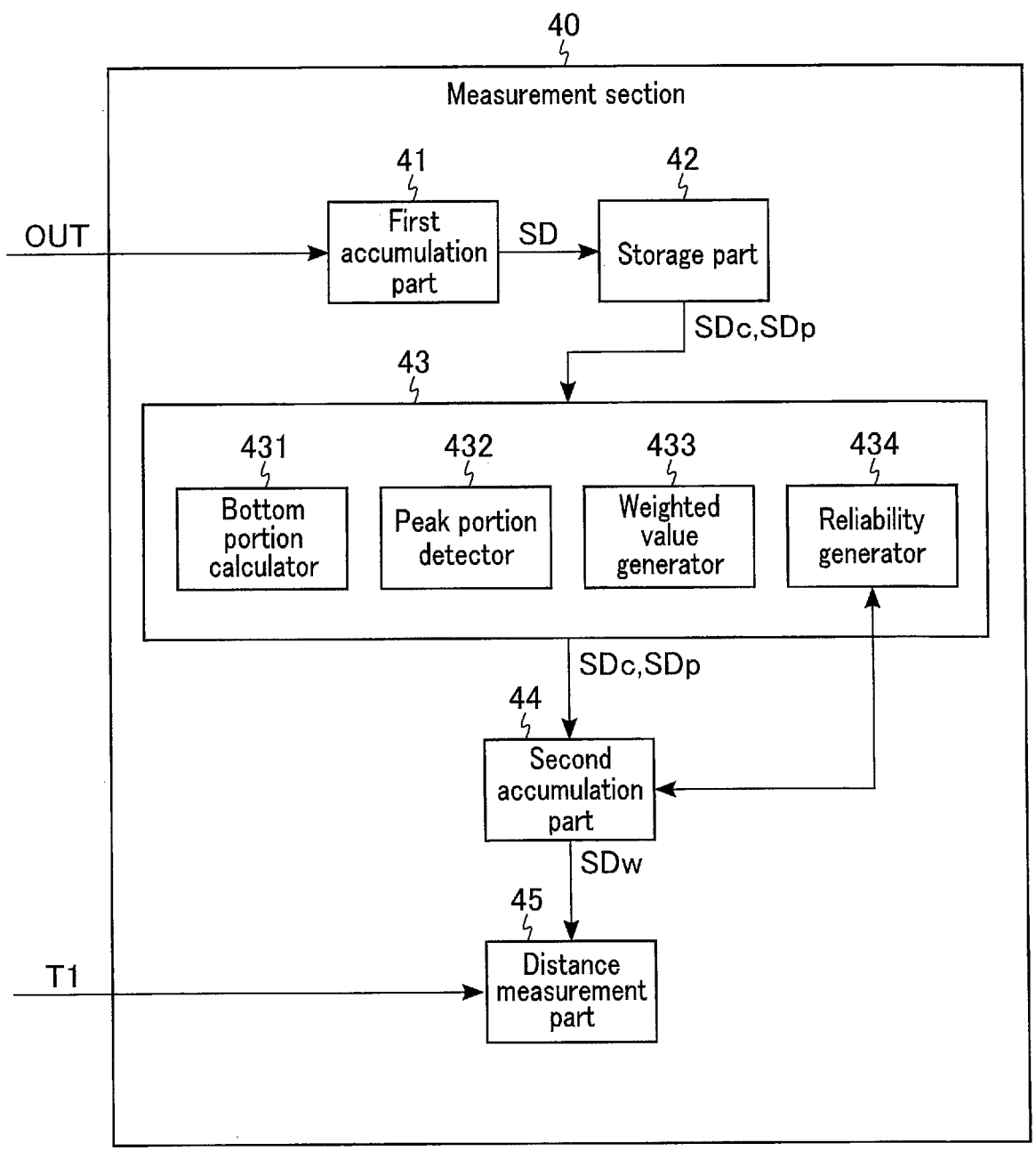
F I G. 29

DISTANCE MEASURING DEVICE

CROSS-REFERENCE TO RELATED APPLICATIONS

This application is based upon and claims the benefit of priority from Japanese Patent Application No. 2020-157620, filed Sep. 18, 2020, the entire contents of which are incorporated herein by reference.

FIELD

Embodiments described herein relate generally to a distance measuring device.

BACKGROUND

A distance measuring device called "LiDAR (Light Detection and Ranging)" is known. A LiDAR irradiates a target object with laser light, and detects the intensity of reflected light reflected from the target object by a sensor (light detector). Then, the LiDAR measures a distance from itself to the target object based on a light intensity signal output from the sensor. There are a number of sensors used in the LiDAR, but a sensor comprising a plurality of silicon photomultipliers is known to be a promising sensor for the future. Since measurement data of the LiDAR is expected to be used in control of a vehicle, etc., high accuracy is required.

BRIEF DESCRIPTION OF THE DRAWINGS

FIG. 3 depicts a schematic diagram showing an example of configurations of an emission section and a light receiver included in the distance measuring device according to the first embodiment.

FIG. 6 depicts a schematic diagram showing an example of a structure of an avalanche photodiode and an operation principle of a single-photon avalanche diode in the distance measuring device according to the first embodiment.

FIG. 7 depicts a plan view showing an example of an active area set in the light detector in the distance measuring device according to the first embodiment.

FIG. 12 depicts time charts showing an example of simple accumulation processing of a signal processor in the distance measuring device according to the first embodiment.

FIG. 13 depicts a schematic diagram showing an example of regions used for distance measurement of a measurement point of a target within a scanning area of the distance measuring device according to the first embodiment.

FIG. 20 depicts time charts showing an example of an effect of an AC coupling for a light reception result of a light detector in the distance measuring device according to the modification of the first embodiment.

FIG. 23 depicts time charts showing an example of an accumulation result using a weighted value in the distance measuring device according to the second embodiment.

FIG. 29 depicts a block diagram showing an example of a configuration of a measurement section in a distance measuring device according to a fifth embodiment.

DETAILED DESCRIPTION

Figure 1:
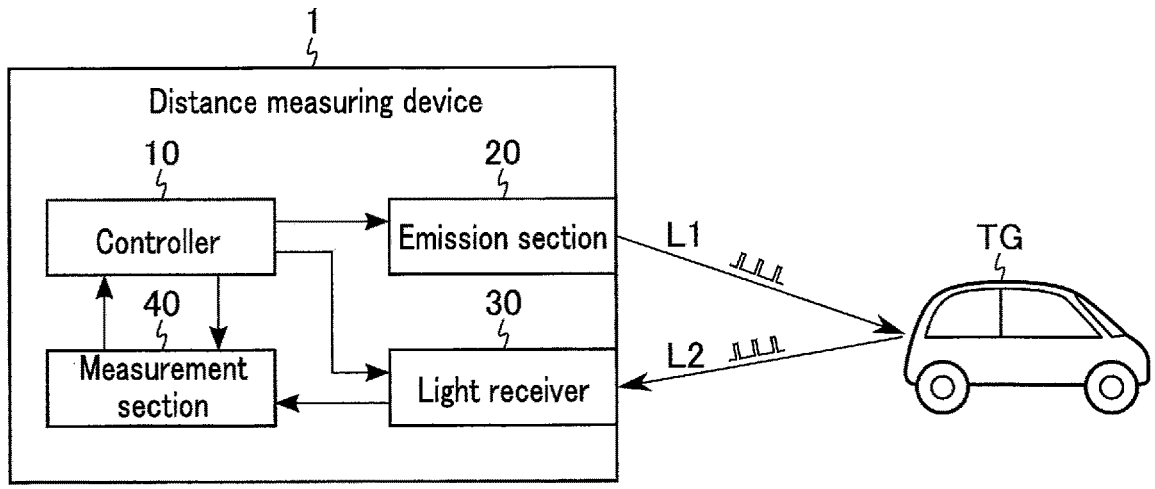
FIG. 1 depicts a schematic diagram showing an example of an overall configuration of a distance measuring device according to a first embodiment.

In general, according to one embodiment, a distance measuring device includes a light emitter, a light receiver, a measurement section, and a controller. The light emitter includes a light source configured to emit an optical signal. The light receiver includes a light detector and an optical system. The optical system is configured to guide reflected light to the light detector. The reflected light is the optical signal emitted from the light emitter and reflected by an external object. The measurement section is configured to calculate a distance value from the object using a first time and a second time. The first time is a time at which the light source emits the optical signal. The second time is a time at which the light detector detects the reflected light. The controller is configured to cause the light source to intermittently emit the optical signal, and cause the measurement section to calculate a distance value for each intermittently emitted optical signal. The measurement section is configured to: receive a first digital signal and a second digital signal from the light receiver, wherein the first digital signal includes a light reception result of reflected light of a first optical signal emitted in a first direction, the first digital signal includes a first bottom portion and a first portion protruding from the first bottom portion, the second digital signal includes a light reception result of reflected light of a second optical signal emitted in a second direction different from the first direction, and the second digital signal includes a second bottom portion and a second portion protruding from the second bottom portion; generate a weighted value based on a degree of similarity of values of the first and second portions, or a degree of similarity of values of the first and second bottom portions; generate a third digital signal obtained by adding the second digital signal to the first digital signal based on the weighted value, and the third digital signal including a third bottom portion and a third portion protruding form the third bottom portion; and calculate a distance value from an object existing in the first direction by calculating the second time associated with the first optical signal based on a position of the third portion.

Hereinafter, embodiments will be described with reference to the drawings. Each embodiment exemplifies a device and a method for embodying a technical idea of the invention. The drawings are schematic or conceptual, and the dimensions and ratios, etc. in the drawings are not always the same as those of the actual products. In the drawings to be referred to below, an "X direction" and a "Y direction" correspond to directions intersecting each other. The technical idea of the present invention is not specified by the shapes, structures, arrangements, etc. of the structural elements. In the following descriptions, structural elements having substantially the same function and configuration will be denoted by the same reference symbol. The numbers after the letters that make up the reference signs are used to distinguish between elements referenced by reference signs containing the same characters and that have a similar configuration.

[1] First Embodiment

A distance measuring device 1 according to a first embodiment is, for example, a type of LiDAR (Light Detection and Ranging) capable of measuring a distance between the distance measuring device 1 and a target object TG. The distance measuring device 1 according to the first embodiment will be described below.

[1-1] Configuration

[1-1-1] Overall Configuration of Distance Measuring Device 1

FIG. 1 depicts a schematic diagram showing an example of an overall configuration of the distance measuring device 1 according to the first embodiment. As shown in FIG. 1, in this example, a vehicle is located in front of the distance measuring device 1 as a ranging target object TG. Then, the distance measuring device 1 according to the first embodiment includes, for example, a controller 10, an emission section 20, a light receiver 30, and a measurement section 40.

The controller 10 controls an overall operation of the distance measuring device 1. The controller 10 includes, for example, a CPU (Central Processing Unit), a ROM (Read Only Memory), a RAM (Random Access Memory), and an oscillator, all of which are not shown. The ROM stores a program used for an operation of the distance measuring device 1, etc. The CPU controls the emission section 20, light receiver 30, and measurement section 40 according to the program stored in the ROM. The RAM is used as a working area of the CPU. The oscillator is used for generating an intermittent pulse signal. The controller 10 is also capable of executing various data processing and arithmetic processing.

The emission section 20 intermittently generates and emits laser light. The generated and emitted laser light is applied to the target object TG, and used for measuring a distance between the distance measuring device 1 and the target object TG. In the present specification, the laser light emitted from the emission section 20 is referred to as "outgoing light L1". The outgoing light L1 reflected by the target object TG is referred to as "reflected light L2". The emission section 20 may be referred to as a light emitter.

The light receiver 30 detects light incident on the distance measuring device 1, and transfers a light reception result to the measurement section 40. In other words, the light receiver 30 converts the light incident on the distance measuring device 1 into an electric signal, and transfers the converted electric signal to the measurement section 40. The light receiver 30 is used for detecting the reflected light L2 intermittently incident on the distance measuring device 1.

The measurement section 40 measures a time at which the light receiver 30 detects the reflected light L2 based on the light reception result transferred from the light receiver 30. Then, the measurement section 40 measures the distance between the distance measuring device 1 and the target object TG based on a time at which the outgoing light L1 is emitted from the emission section 20 and the time at which the light receiver 30 detects the reflected light L2. The time at which the outgoing light L1 is emitted from the emission section 20 is, for example, reported from the controller 10.

Figure 2:
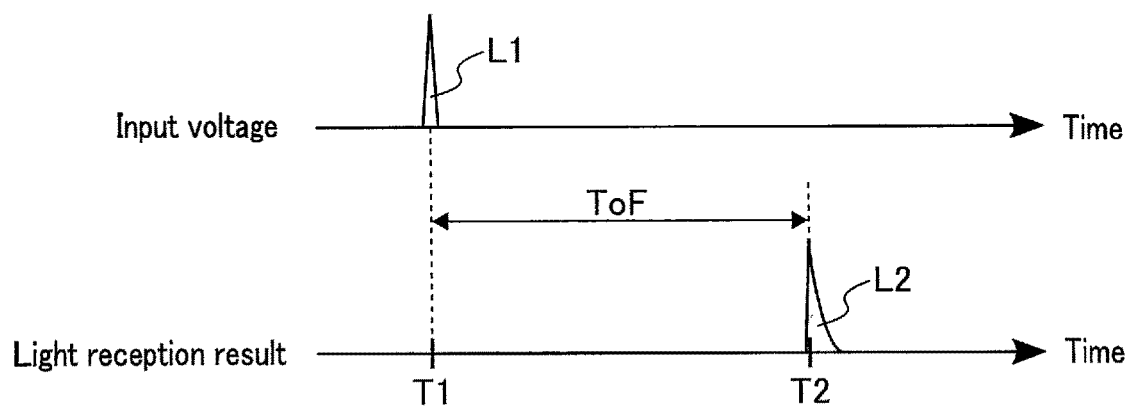
FIG. 2 depicts a schematic diagram showing an example of a ranging method of the distance measuring device according to the first embodiment.

FIG. 2 depicts a schematic diagram that outlines a ranging method of the distance measuring device 1 according to the first embodiment. The waveform of an input voltage indicates a temporal change in voltage to be supplied to the light source included in the emission section 20. The waveform of a light reception result indicates a temporal change in strength of an electric signal based on light detected by the light receiver 30. As shown in FIG. 2, when a pulse signal is supplied to the light source of the emission section 20, the outgoing light L1 is generated and emitted based on a rise of the pulse signal. Then, said outgoing light L1 is applied to the target object TG, and the light receiver 30 detects the reflected light L2 reflected from the target object TG.

The measurement section 40 calculates a time of flight (ToF) of the outgoing light L1 based on a difference between an emission time T1 at which the outgoing light L1 is emitted from the emission section 20 and a light-receiving time T2 at which the light receiver 30 detects the reflected light L2. Then, the measurement section 40 measures (ranges) the distance between the distance measuring device 1 and the target object TG based on the time of flight of the outgoing light L1 and the velocity of the laser light. Such a ranging method of the distance measuring device 1 may be called a "ToF method". The measurement section 40 outputs a ranging result for each set of the outgoing light L1 and the reflected light L2 that the distance measuring device 1 emits and receives.

The measurement section 40 may decide the emission time T1 based at least on a time relating to emission of the outgoing light L1, and decide the light-receiving time T2 based on a time relating to light reception of the reflected light L2. In other words, the measurement section 40 may decide the emission time T1 and the light-receiving time T2 based on a peak portion of a signal, e.g., a rise time or a peak time of the signal. The controller 10 may be provided for each of the emission section 20, the light receiver 30, and the measurement section 40. Processing of the measurement section 40 may be performed by the controller 10. The distance measuring device 1 may include an image processor that generates an image based on a ranging result of the measurement section 40. Such an image is referred to by a control program of a vehicle, etc. equipped with the distance measuring device 1.

[1-1-2] Configuration of Emission Section 20

FIG. 3 depicts a schematic diagram showing an example of configurations of the emission section 20 and the light receiver 30 included in the distance measuring device 1 according to the first embodiment. As shown in FIG. 3, the emission section 20 in the first embodiment includes, for example, drivers 21 and 22, a light source 23, an optical system 24, and a mirror 25.

The driver 21 generates a drive current according to a pulse signal input from the oscillator of the controller 10. Then, the driver 21 supplies the generated drive current to the light source 23. That is, the driver 21 functions as a current supply source of the light source 23.

The driver 22 generates a drive current according to control performed by the controller 10. Then, the driver 22 supplies the generated drive current to the mirror 25. That is, the driver 22 functions as a power supply circuit of the mirror 25.

The light source 23 is a laser light source, such as a laser diode. The light source 23 intermittently emits laser light (outgoing light L1) based on the intermittent drive current (pulse signal) supplied from the driver 21. The laser light emitted by the light source 23 is incident on the optical system 24.

The optical system 24 can include a plurality of lenses and optical elements. The optical system 24 is arranged on an optical path of the outgoing light L1 emitted by the light source 23. For example, the optical system 24 collimates the incident outgoing light L1, and guides the collimated outgoing light L1 to the mirror 25. The optical system 24 shown in FIG. 3 is a so-called non-coaxial optical system, but is not limited thereto in the present embodiment. The optical system 24 may be a coaxial optical system, and may include a perforated mirror, a beam splitter, etc.

The mirror 25 is driven based on the drive current supplied from the driver 22, and reflects the outgoing light L1 incident on the mirror 25. For example, a reflecting surface of the mirror 25 is formed to be rotatable around two axes intersecting each other. The outgoing light L1 reflected by the mirror 25 is applied to the target object TG outside the distance measuring device 1. As will be described later, the mirror may be a revolving mirror, such as a polygon mirror.

In the distance measuring device 1 according to the first embodiment, the controller 10 changes an emitting direction of the outgoing light L1 by controlling the mirror 25 so as to scan an area to be ranged. The emission section 20 may have a configuration capable of performing scanning using laser light, or may have other configurations. For example, the emission section 20 may further include an optical system arranged on an optical path of laser light reflected by the mirror 25.

In the present specification, an area that is ranged by the distance measuring device 1 is referred to as a "scanning area SA". The distance measuring device 1 performs a measurement operation of a plurality of points within the scanning area SA to measure distances from various target objects TG. In addition, a set of ranging results of a plurality of points corresponding to single scanning is referred to as a "frame". The distance measuring device 1 performs scanning continuously so that it can sequentially acquire a distance from a target object TG in front of itself.

[1-1-3] Configuration of Light Receiver 30

The configuration of the light receiver 30 in the first embodiment will be described still with reference to FIG. 3. As shown in FIG. 3, the light receiver 30 in the first embodiment includes, for example, an optical system 31, a light detector 32, and an output circuit 33.

The optical system 31 can include at least one lens. The optical system 31 collects the reflected light L2 incident on the distance measuring device 1 to the light detector 32. The light detector 32 includes, for example, a photomultiplier element using a semiconductor, and converts light incident on the light detector 32 via the optical system 31 into an electric signal. The electric signal (light reception result) converted by the light detector 32 is transferred to the output circuit 33. The output circuit 33 converts the electric signal transferred from the light detector 32 into a digital signal. Then, the output circuit 33 outputs the digital signal corresponding to the light reception result to the measurement section 40.

In the distance measuring device 1 according to the first embodiment, an optical axis of the light detector 32 of the light receiver 30 is different from that of the light source 23 of the emission section 20. That is, the distance measuring device 1 includes a non-coaxial optical system between the emission section 20 and the light receiver 30. The light receiver 30 may have other configurations, e.g., a coaxial optical system or a separation optical system, as long as it can detect the reflected light L2 incident on the distance measuring device 1.

(Configuration of Light Detector 32)

Figure 4:
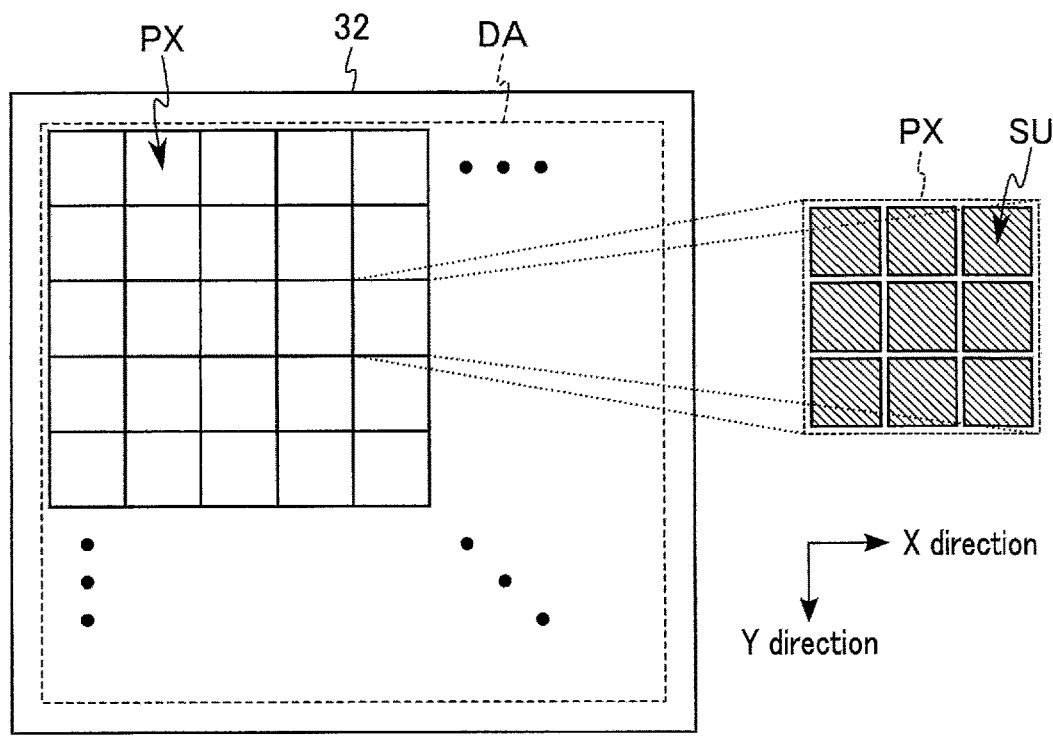
FIG. 4 depicts a plan view showing an example of a planar layout of a light detector in the distance measuring device according to the first embodiment.

FIG. 4 depicts a plan view showing an example of a planar layout of the light detector 32 in the distance measuring device 1 according to the first embodiment. As shown in FIG. 4, the light detector 32 according to the first embodiment is a 2D sensor, and includes a light-receiving area DA. A 1D sensor may also be used as the light detector 32.

The light-receiving area DA is an area used for detecting light incident on the distance measuring device 1. The light-receiving area DA includes a plurality of pixels PX. The pixel PX corresponds to the minimum unit of a light reception result output from the light detector 32. The plurality of pixels PX are, for example, arranged two-dimensionally on a semiconductor substrate; in other words, the pixels PX are arranged in a matrix along an XY plane on the semiconductor substrate. The XY plane is a plane formed by an X direction and a Y direction, and is parallel to a surface of the substrate on which the light-receiving area DA of the light detector 32 is formed. A coordinate corresponding to the X direction and a coordinate corresponding to the Y direction are assigned to each of the pixels PX.

Each of the pixels PX includes at least one SPAD unit SU. The SPAD unit SU includes a photomultiplier element. As the photomultiplier element, for example, a single-photon avalanche diode (SPAD) is used. In a case where the pixel PX includes a plurality of SPAD units SU, the SPAD units SU are arranged, for example, in a matrix along the XY plane. The pixel PX including a plurality of SPADs is also referred to as a "silicon photomultiplier (SiPM)".

Each of the number of pixels PX included in the light detector 32 and the number of SPAD units SU included in the pixel PX can be freely designed. Each of the shape of the pixel PX and the shape of the SPAD unit SU can be freely designed. Each of the shape of the pixel PX and the shape of the SPAD unit SU may not necessarily be a single shape. In the pixel PX, the number of SPAD units SU aligned in the X direction and that of SPAD units SU aligned in the Y direction may be different. The shape of the pixel PX can be designed according to the number, arrangement, etc. of SPAD units SU included in the pixel PX.

(Circuit Configuration of SPAD Unit SU)

Figure 5:
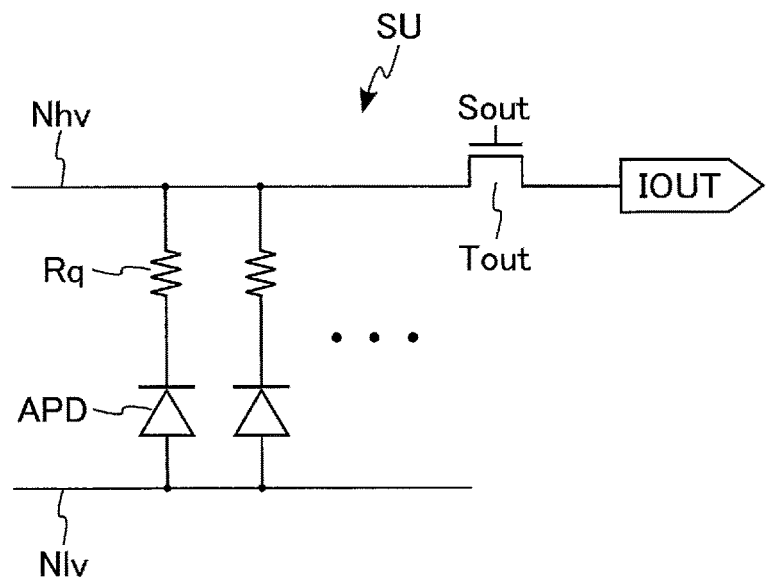
FIG. 5 depicts a circuit diagram showing an example of a circuit configuration of a SPAR unit included in the distance measuring device according to the first embodiment.

FIG. 5 depicts a circuit diagram showing an example of a circuit configuration of a SPAD unit SU included in the distance measuring device 1 according to the first embodiment. As shown in FIG. 5, the SPAD unit SU in the first embodiment includes a set of at least one avalanche photodiode APD and a quench resistor Rq, a high voltage node Nhv, a low voltage node Nlv, and a P-type transistor Tout. The number of sets of avalanche photodiode APD and quench resistor Rq corresponds to the number of SPADs included in the SPAD unit SU.

The set of avalanche photodiode APD and quench resistor Rq is coupled in series between the high voltage node Nhv and the low voltage node Nlv. Specifically, the anode of the avalanche photodiode APD is coupled to the low voltage node Nlv. The cathode of the avalanche photodiode APD is coupled to one end of the quench resistor Rq. The other end of the quench resistor Rq is coupled to the high voltage node Nhv. In the measurement operation of the distance measuring device 1, a voltage applied to the high voltage node Nhv is higher than a voltage applied to the low voltage node Nlv. That is, a reverse bias is applied to the avalanche photodiode APD.

The high voltage node Nhv corresponds to an output node of the SPAD unit SU. The drain of the P-type transistor Tout is coupled to the high voltage node Nhv. A control signal Sout is input to the gate of the P-type transistor Tout. In a case where a voltage of the control signal Sout is a level "L", an output signal IOUT based on the voltage of the high voltage node Nhv is output from the source of the P-type transistor Tout. The output signal IOUT corresponds to a light reception result of the SPAD unit SU. In a case where a voltage of the control signal Sout is a level "H", the P-type transistor Tout cuts off the output of the light reception result by the SPAD unit SU. The controller 10 can control the control signal Sout per a plurality of pixels PX.

The SPAD unit SU may have other circuit configurations. For example, the drain of an N-type transistor may be coupled to the high voltage node Nhv, the control signal Sout may be coupled to the gate thereof, and the source thereof may be coupled to an appropriate low voltage. Then, in a case where the output of the output signal IOUT by the P-type transistor Tout is cut off, the current may be discharged through the N-type transistor. For example, the quench resistor Rq may be replaced with a transistor. A transistor used for quenching which is different from the quench resistor Rq may be coupled to the high voltage node Nhv. The arrangement of the high voltage node Nhv (output node) may be other arrangements as long as it is capable of outputting a light reception result by the avalanche photodiode APD. The P-type transistor Tout may be formed by a plurality of transistors coupled in series. The transistor Tout may be an N-type transistor. The transistor Tout may be other switch elements as long as it is capable of selectively outputting the output signal IOUT. In a case where a pixel PX includes a plurality of SPAD units SU, an output signal of the pixel PX, for example, corresponds to a sum of output signals IOUT of the SPAD units SU belonging to the pixel PX.

(Structure of Avalanche Photodiode APD)

FIG. 6 depicts a schematic diagram showing an example of a structure of an avalanche photodiode APD and an operation principle of a single-photon avalanche diode SPAD in the distance measuring device 1 according to the first embodiment. As shown in FIG. 6, the avalanche photodiode APD according to the first embodiment includes, for example, a substrate 50, P-type semiconductor layers 51 and 52, and an N-type semiconductor layer 53.

The substrate 50 is, for example, a P-type semiconductor substrate. On the substrate 50, the P-type semiconductor layer 51, P-type semiconductor layer 52, and N-type semiconductor layer 53 are stacked in this order. For example, the P-type semiconductor layer 51 is formed thicker than the P-type semiconductor layer 52. The concentration of P-type impurities doped in the P-type semiconductor layer 52 is higher than that of P-type impurities doped in the P-type semiconductor layer 51. A PN junction is formed at a contact portion between the P-type semiconductor layer 52 and the N-type semiconductor layer 53. Thereby, the P-type semiconductor layer 52 and the N-type semiconductor layer 53 are used as the anode and the cathode of the avalanche photodiode APD, respectively, The avalanche photodiode APD in the first embodiment is used in a Geiger mode. Then, a SPAD using the avalanche photodiode APD detects light in units of photons, and converts the light into an electric signal. In the following, an operation principle of the SPAD using the avalanche photodiode APD shown in FIG. 6 will be described. In this example, the substrate 50 side corresponds to the low voltage node Nlv of the SPAD unit SU. The N-type semiconductor layer 53 side corresponds to the high voltage node Nhv of the SPAD unit SU.

When a high reverse bias is applied to the avalanche photodiode APD, a strong electric field is generated between the P-type semiconductor layer 52 and the N-type semiconductor layer 53 (FIG. 6 (1)). Accordingly, a depletion layer is formed over an area from the PN junction between the P-type semiconductor layer 52 and the N-type semiconductor layer 53 to the P-type semiconductor layer 51 (FIG. 6

(2)). At this time, the avalanche photodiode APD enters a state (hereinafter, referred to as an active state) capable of detecting light. When the avalanche photodiode APD in the active state is irradiated with light, some energy of the light reaches the depletion layer (FIG. 6 (3)). As a result, a pair of an electron and an electron hole, i.e., a carrier, is generated in the depletion layer (FIG. 6 (4)). The carrier generated in the depletion layer drifts due to a strong electric field in the vicinity of the PN junction (FIG. 6 (5)). Specifically, the electron hole of the generated carrier is accelerated toward the substrate 50 side, and the electron of the generated carrier is accelerated toward the N-type semiconductor layer 53 side.

The electron accelerated toward the N-type semiconductor layer 53 side collides with an atom under the strong electric field in the vicinity of the PN junction. As a result, the electron that collided with the atom ionizes the atom, and generates a new pair of an electron and an electron hole. Such generation of a pair of an electron and an electron hole is repeated if a voltage of a reverse bias applied to the avalanche photodiode APD exceeds a breakdown voltage of the avalanche photodiode APD (FIG. 6 (6) Avalanche breakdown). When the avalanche breakdown occurs, the avalanche photodiode APD discharges an electric current (FIG. 6 (7) Avalanche current). Electric signals related to the avalanche current and recovery thereafter are output from the avalanche photodiode APD, namely one SPAD.

The electric current output from the avalanche photodiode APD, for example, flows in the quench resistor Rq. As a result, a voltage drop occurs in the output node of the SPAD unit SU (FIG. 6 (8) Quenching). By quenching, when the voltage of the reverse bias applied to the avalanche photodiode APD drops below the breakdown voltage, the Geiger discharge is stopped. Then, momently after flow of a recovery current into the avalanche photodiode APD and the Geiger discharge in which charging of the capacity at the PN junction is performed are stopped, the avalanche photodiode APD returns to a state capable of detecting light.

The avalanche photodiode APD included in the SPAD unit SU may have other configurations. For example, the P-type semiconductor layer 52 may be omitted. The thickness of each of the P-type semiconductor layer 51, P-type semiconductor layer 52, and N-type semiconductor layer 53 can be changed according to the design of the avalanche photodiode APD. The PN junction of the avalanche photodiode APD may be formed at a contact portion between the substrate 50 and the semiconductor layer on the substrate 50. The avalanche photodiode APD may have a structure in which the P-type semiconductor layer and the N-type semiconductor layer shown in FIG. 6 are replaced with each other.

(Active Area AA of Light Detector 32)

The reflected light L2 incident on the distance measuring device 1 according to the first embodiment is, for example, applied to a part of the light-receiving area DA based on a scanning position of the outgoing light L1 and a design of the optical system 31. Then, the controller 10 sets the SPAD unit SU included in each pixel PX to an active state or an inactive state based on an irradiation position of the reflected light L2.

In the present specification, a pixel PX including an SPAD unit SU controlled to be in a state capable of detecting light is referred to as a pixel PX in an ON state. A pixel PX including an SPAD unit SU controlled to be in a state incapable of detecting light is referred to as a pixel PX in an OFF state. An area including at least one pixel PX in an ON state that the controller 10 sets in the light-receiving area DA is referred to as an "active area AA".

FIG. 7 depicts a plan view showing an example of an active area AA set in the light-receiving area DA of the light detector 32 in the distance measuring device 1 according to the first embodiment. As shown in FIG. 7, in the measurement operation of the distance measuring device 1, the controller 10 notifies the light detector 32 of an X coordinate Cx and a Y coordinate Cy of the light-receiving area DA for each beam of outgoing light L1. Then, the light detector 32 sets the active area AA within the light-receiving area DA based on the X coordinate Cx and the Y coordinate Cy designated by the controller 10.

The X coordinate Cx and the Y coordinate Cy are, for example, associated with an inclination of the mirror 25 at a timing at which the outgoing light L1 is emitted, and indicate coordinates of an upper-left pixel PX of the active area AA. The active area AA is, for example, set to an area having an expanse of four pixels by three pixels in the X direction and the Y direction, respectively, with the X coordinate Cx and the Y coordinate Cy as a reference. In other words, in this example, the active area AA is set to a rectangular area including 4×3 pixels. As described above, when the active area AA is set within the light-receiving area DA, only a pixel PX of an area estimated to be irradiated with the reflected light L2 outputs a light reception result.

Thereby, noise from a pixel PX outside the active area AA is canceled from the light reception result of the light detector 32, and an S/N ratio (signal-to-noise ratio) of the light reception result increases. In addition, application of a voltage to the pixel PX outside the active area AA is appropriately omitted so that power consumption of the light detector 32 is suppressed. Note that the position of the active area AA may be set based at least on coordinates designated by the controller 10. The shape of the active area AA may be changed according to the coordinates designated by the controller 10.

(Configuration of Output Circuit 33)

Figure 8:
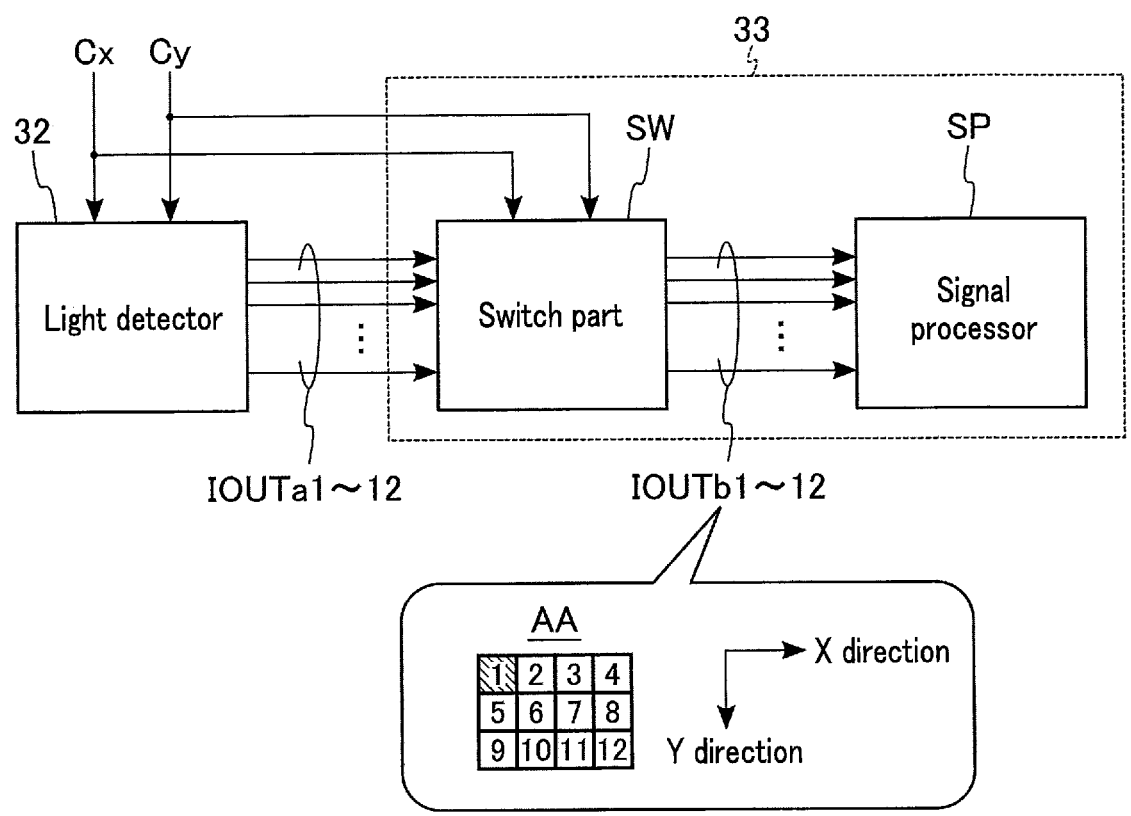
FIG. 8 depicts a block diagram showing an example of a configuration of an output circuit included in the light receiver in the distance measuring device according to the first embodiment.

FIG. 8 depicts a block diagram showing an example of a configuration of the output circuit 33 in the distance measuring device 1 according to the first embodiment. As shown in FIG. 8, the output circuit 33 in the first embodiment includes, for example, a switch part SW and a signal processor SP.

The switch part SW includes a plurality of switch circuits. The switch part SW appropriately re-couples a plurality of switch circuits based on the X coordinate Cx and the Y coordinate Cy indicating the position of the active area AA. By virtue of such a switch part SW, the number of signal lines used for output of the pixels PX in the light detector 32 can be reduced. The switch part SW aligns the order of a plurality of output signals IOUT output from the light-receiving area DA. For example, in a case where output signals IOUTa1 to IOUTa12 corresponding to twelve pixels PX within the active area AA are output from the light detector 32, the switch part SW aligns the input output signals IOUTa1 to IOUTa12 and outputs the aligned output signals IOUTb1 to IOUTb12 to the signal processor SP. The output order of each pixel PX within the active area AA is changed to, for example, the order shown in the lower portion of FIG. 8.

The signal processor SP performs various signal processing by using the plurality of output signals IOUT that are input from the switch part SW. The signal processor SP can include, for example, an analog circuit like an amplifier circuit, an analog-to-digital converter (ADC), a time-to-digital converter (TDC), and a logic circuit like an adder. For example, the signal processor SP performs analog-to-digital conversion to each of the output signals IOUTb1 to IOUTb12 that are input, and generates a digital signal based on a light reception result of the light detector 32. Then, the signal processor SP transfers the digital signal based on the light reception result to the measurement section 40. As described above, the output signals IOUTb1 to IOUTb12 aligned by the switch part SW are input so that the signal processor SP can perform the signal processing without changing the order of relative positions within the active area AA.

Note that the light-receiving area DA, the switch part SW, and the signal processor SP may be formed on respectively different substrates. The switch part SW and the signal processor SP may be provided integrally. Output signals of the pixels PX within the active area AA may be integrated according to the arrangement of the pixels within the active area AA.

[1-1-4] Configuration of Measurement Section 40

Figure 9:
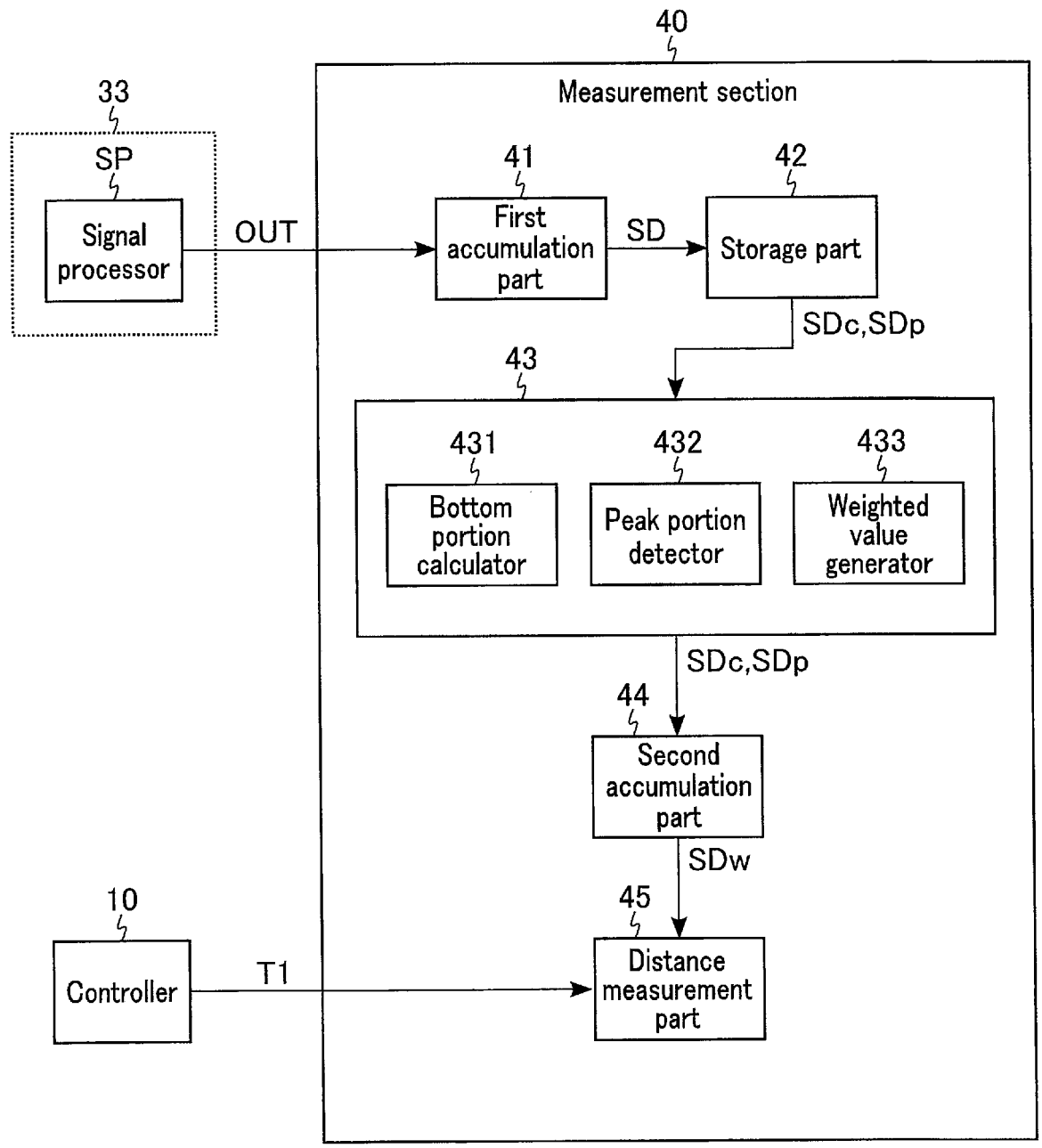
FIG. 9 depicts a block diagram showing an example of a configuration of a measurement section in the distance measuring device according to the first embodiment.

FIG. 9 depicts a block diagram showing an example of a configuration of the measurement section 40 in the distance measuring device 1 according to the first embodiment. As shown in FIG. 9, the measurement section 40 in the first embodiment includes, for example, a first accumulation part 41, a storage part 42, an analysis part 43, a second accumulation part 44, and a distance measurement part 45.

The first accumulation part 41 performs simple accumulation processing of data relating to light reception results. Specifically, the first accumulation part 41 simply adds light reception results of a plurality of pixels PX transferred from the signal processor SP of the light receiver 30 so as to generate accumulation data SD. Then, the first accumulation part 41 transfers the accumulation data SD obtained for each beam of outgoing light L1 to the storage part 42.

The storage part 42 temporarily stores the accumulation data SD obtained for each beam of outgoing light L1. The storage part 42 can store the accumulation data SD for one frame, for example. The storage part 42 may store the accumulation data SD for a plurality of frames. The accumulation data SD stored in the storage part 42 may be appropriately discarded according to the progress of a measurement operation to be described later.

The analysis part 43 reads accumulation data SDc of a measurement point of a target and accumulation data SDp of measurement points in the vicinity of the target from the storage part 42. In the present specification, "a measurement point of a target" indicates a measurement point corresponding to the reflected light L2 of the outgoing light L1 to be ranged. For calculation of a distance value at the measurement point of the target, the distance measuring device 1 utilizes the accumulation data SDp of at least one measurement point in the vicinity of the target.

In accumulation, the analysis part 43 includes, for example, a bottom portion calculator 431, a peak portion detector 432, and a weighted value generator 433. The bottom portion calculator 431 calculates a value of a bottom portion of each of the accumulation data SDc and SDp. In the following, a "value of a bottom portion of the accumulation data SD" is also referred to as a "floor noise value". The peak portion detector 432 detects a peak portion of a signal that can be estimated to be a detection of the reflected light L2. The weighted value generator 433 generates a weighted value of each piece of accumulation data SDp based on outputs of the bottom portion calculator 431 and the peak portion detector 432. An example of a specific calculation method of a weighted value will be described later.

The second accumulation part 44 adds the accumulation data SDp to the accumulation data SDc by using a weighted value of each piece of accumulation data SDp. Then, the second accumulation part transfers the generated accumulation data SDw to the distance measurement part 45. Details of accumulation processing using a weighted value will be described later.

The distance measurement part 45 acquires data relating to the emission time T1 of the outgoing light L1 from the controller 10, and acquires the accumulation data SDw relating to the measurement point of the target from the second accumulation part 44. Then, the distance measurement part 45 calculates the light-receiving time T2 of the reflected light L2 based on the accumulation data SDw transferred from the second accumulation part 44. After that, the distance measurement part 45 measures a distance based on a ToF method by using the emission time T1 and the light-receiving time T2 of the light detector 32. The measurement result is, for example, transferred to an image processor. The measurement result may be referred to by the controller 10.

[1-2] Operation

[1-2-1] Scanning Method

Figure 10:
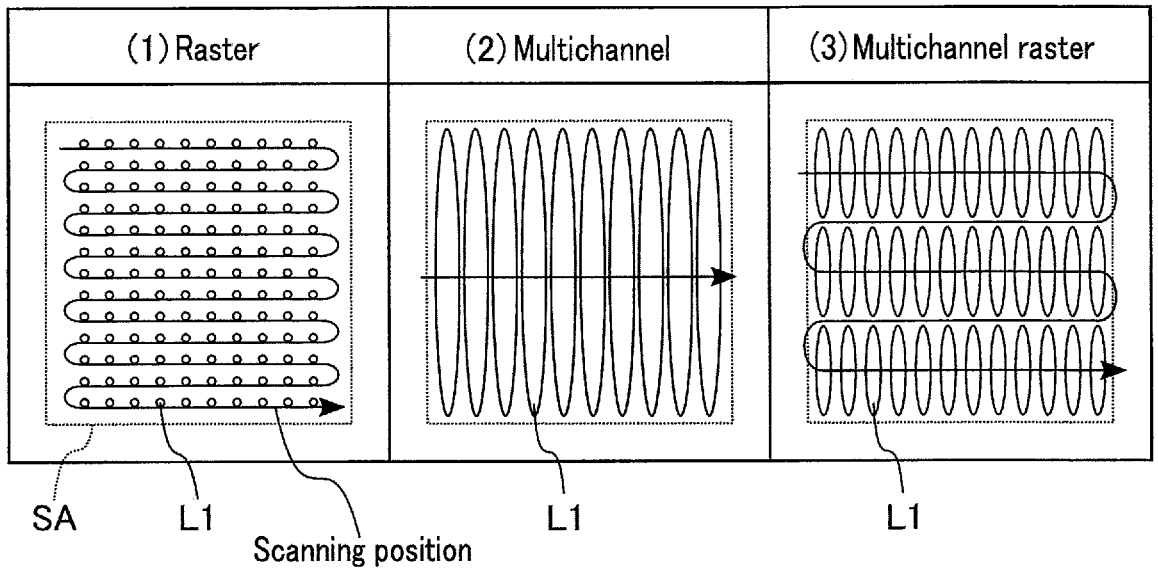
FIG. 10 depicts a table showing an example of a scanning method of the emission section in the distance measuring device according to the first embodiment.

FIG. 10 depicts a table showing an example of a scanning method of the distance measuring device 1 according to the first embodiment. The table shown in FIG. 10 indicates three types of combinations of a name and a specific example of a scanning method. In FIG. 10, reference sign "L1" indicates the shape and the emission timing of the outgoing light L1 in the associated scanning method. The arrow "scanning position" schematically indicates a path in which a plurality of beams of outgoing light L1 are emitted in sequence, within the scanning area SA. "Leftward direction" and "rightward direction" refer to the leftward direction and the rightward direction on the drawing sheet, respectively.

In the scanning method shown in FIG. 10 (1), for example, the outgoing light L1 having a dot-shaped irradiation surface is used. Then, the distance measuring device 1 performs scanning in the rightward and leftward directions repeatedly. Specifically, the distance measuring device 1 scans in the rightward direction and then turns back to scan in the leftward direction, and after scanning in the rightward direction again, turns back again to scan in the leftward direction. Such a scanning method is referred to as "raster scanning". As a means for realizing the raster scanning, it is conceivable to use, for example, a biaxial mirror as the mirror 25.

In the scanning method shown in FIG. 10 (2), the outgoing light L1 having an irradiation surface elongated in the longitudinal direction is used. In this case, the emission section 20 includes, for example, a collimator lens and a cylindrical lens. Then, the distance measuring device 1 irradiates a plurality of pixels PX in a longitudinal line at the same time, and scans in the rightward direction. Such a scanning method is referred to as "multichannel scanning". As a means for realizing the multichannel scanning, it is conceivable to use a polygon mirror, a revolving mirror, or a single-axis MEMS mirror, as the mirror 25. The multichannel scanning may be realized by rotating the distance measuring device 1 itself without using the mirror 25. The multichannel scanning can irradiate a plurality of pixels PX at the same time in a single laser emission. Thus, use of the multichannel scanning enables higher resolution and/or a higher frame rate than the raster scanning.

In the scanning method shown in FIG. 10 (3), the outgoing light L1 having an irradiation surface elongated in the longitudinal direction is used. In this case, the emission section 20 includes, for example, an anisotropic aspherical collimator lens. Then, the distance measuring device 1 irradiates a plurality of pixels in a longitudinal line at the same time and scans in the rightward direction, and then repeatedly performs scanning shifted in the perpendicular direction. Such a scanning method is referred to as "multichannel raster scanning". As a means for realizing the multichannel raster scanning, it is conceivable to use a polygon mirror having different tilt angles, a revolving mirror, a biaxial mirror, etc., as the mirror 25. Such multichannel raster scanning can also irradiate a plurality of pixels PX at the same time in a single laser emission, and thus can enable higher resolution and/or a higher frame rate than the raster scanning. Conversely, in order to obtain a certain degree of high resolution and high frame rate, it is preferable that the raster scanning or the multichannel raster scanning is used.

The above-described scanning methods are only examples. The scanning methods shown in FIGS. 10 (1) to (3) correspond to mechanical methods. The distance measuring device 1 may use an OPA (Optical Phased Array) method as another scanning method. The number of straight-line paths and the scanning direction in single scanning may be other settings. The operation and effect provided by the distance measuring device 1 according to the first embodiment do not depend on the scanning method of the outgoing light L1. Thus, the distance measuring device 1 according to the first embodiment may perform scanning by using any one of the mechanical methods and the OPA method. Hereinafter, to simplify the description, a case where the distance measuring device 1 uses the raster scanning will be described.

[1-2-2] Sampling of Light Reception Result

Figure 11:
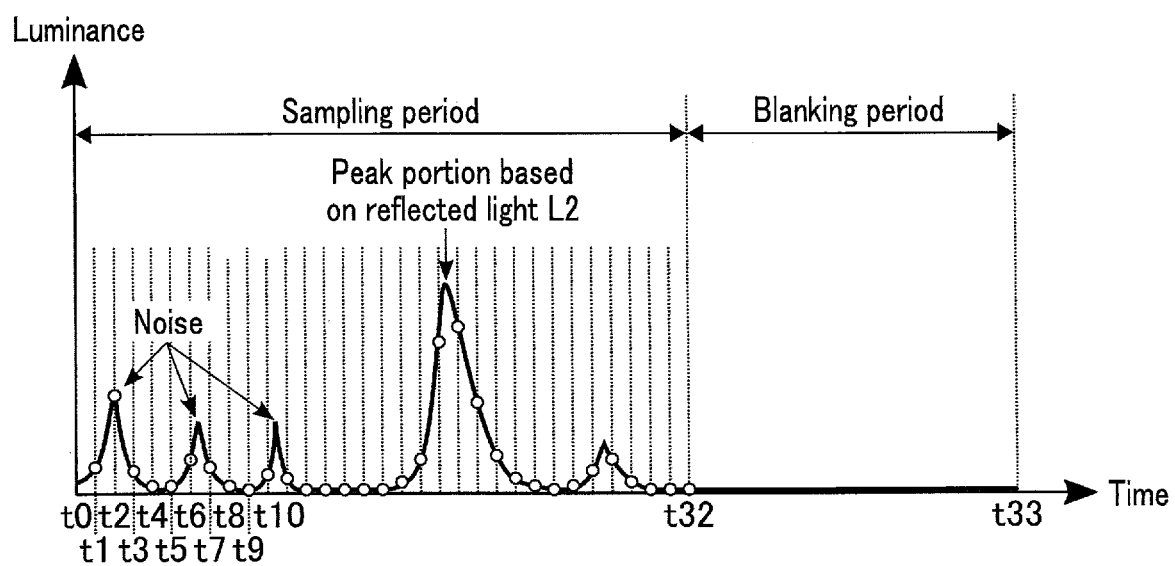
FIG. 11 depicts a time chart showing an example of a light reception result of the light detector in the distance measuring device according to the first embodiment.

FIG. 11 depicts a time chart showing an example of a light reception result of the light detector 32 in the distance measuring device 1 according to the first embodiment. An ordinate axis of the time chart of FIG. 11 represents luminance based on an output signal of a pixel PX. As shown in FIG. 11, each measurement operation performed by the distance measuring device 1 for each beam of outgoing light L1 includes, for example, a sampling period and a blanking period.

The sampling period is a period during which the signal processor SP of the light detector 32 performs signal processing for a light reception result. During the sampling period, the signal processor SP converts an electric signal output from the light-receiving area DA into a digital signal at a predetermined sampling interval. In this example, times t0 to t32 correspond to the sampling period, and the signal processor SP converts the electric signal output from the light-receiving area DA into a digital signal at each of times t1 to t32. Note that the sampling period and the length of the sampling interval may be freely set.

The blanking period is a period set between a sampling period for current outgoing light L1 and a sampling period for next outgoing light L1. During the blanking period, for example, signal processing by the signal processor SP is omitted. In this example, a period from time t32 to time t33 corresponds to the blanking period. In the measurement operation of the distance measuring device 1, the blanking period may be omitted as appropriate. In addition, in a case where the positions of the active areas AA set for respective beams of outgoing light L1 do not overlap each other, sampling periods of consecutive beams of outgoing light L1 may overlap each other.

[1-2-3] Simple Accumulation Processing of Light Reception Result

FIG. 12 depicts time charts showing an example of simple accumulation processing of the measurement section 40 in the distance measuring device 1 according to the first embodiment. Ordinate axes of the two time charts shown in FIG. 12 represent luminance of an analog signal based on a light reception result. FIG. 12 (1) shows an example of an output (light reception result) of each pixel PX within the active area AA. FIG. 12 (2) shows an example of an accumulation result of outputs of a plurality of pixels PX within the active area AA.

As shown in FIG. 12 (1), the output of each pixel PX includes a peak portion based on the reflected light L2 and noise. Ambient light, such as sunlight scattered by a certain object, may be incident on the distance measuring device 1, and the ambient light would appear as random noise in a light reception result. That is, the location where noise is generated varies from pixel PX to pixel PX. On the other hand, the peak portion based on the reflected light L2 usually has a luminance higher than that of noise. Since the output for each pixel PX has a narrow dynamic range, a difference between the noise and the peak portion based on the reflected light L2 is small.

As shown in FIG. 12 (2), when simple accumulation processing is performed for the outputs of the plurality of pixels PX within the active area AA, a characteristic portion of each output is emphasized. Specifically, the reflected light L2 from the target object TG is sampled at almost the same timing. Thus, a strength of a signal of a portion at which the reflected light L2 is detected increases by the simple accumulation processing. On the other hand, the random noise has no reproducibility, i.e., it is difficult for it to be emphasized by the simple accumulation processing.

As a result, in a light reception result through the simple accumulation processing, the random noise is relatively reduced with respect to the reflected light L2 from the target object TG. In other words, an S/N ratio of a digital signal in the light reception result of the reflected light L2 is improved by the simple accumulation processing. Then, in the distance measuring device 1 according to the first embodiment, the accumulation data SD for each measurement point obtained by the simple accumulation processing is stored in the storage part 42.

[1-2-4] Regions Used for Ranging

FIG. 13 depicts a schematic diagram showing an example of regions used for ranging of a measurement point of a target within a scanning area SA of the distance measuring device 1 according to the first embodiment. As shown in FIG. 13, the scanning area SA includes regions AR to IR. Each of the regions AR to IR corresponds to a region irradiated with outgoing light L1. In the following, a region in which one ranging result can be obtained by the outgoing light L1 being applied is also referred to as a "measurement point".

In addition, target objects TG1 and TG2 in different positions are included in the scanning area SA. Specifically, the regions AR, BR, CR, ER, FR, and IR mainly include the target object TG1. The regions DR, GR, and HR mainly include the target object TG2. For example, when raster scanning is performed, the regions AR to IR are respectively irradiated with different outgoing light L1. When multichannel scanning is performed, a plurality of regions (e.g., the regions AR, DR, and GR) aligned longitudinally are irradiated with a single outgoing light L1 at the same time.

With the region ER, for example, the regions AR, BR, CR, DR, FR, GR, HR, and IR are associated as regions for calculating a distance value of a measurement point of a target. In this case, the second accumulation part 44 accumulates accumulation data SDp of each of the weighted regions AR, BR, CR, DR, FR, GR, HR, and IR on accumulation data SDc corresponding to the region ER. In each region, the accumulation data SDp accumulated on the accumulation data SDc may be set corresponding to a measurement point of at least one portion around the measurement point of the target.

Figure 14:
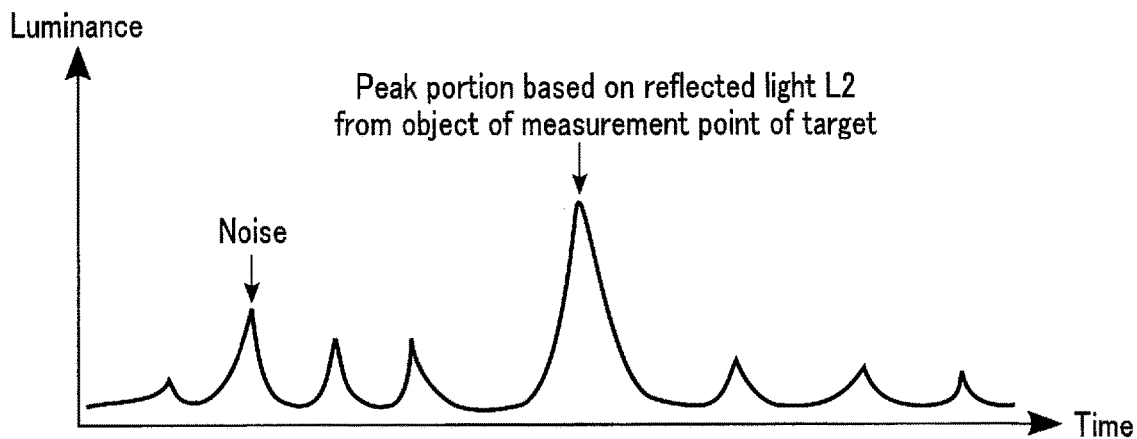
FIG. 14 depicts time charts showing an example of a light reception result for each target object in the distance measuring device according to the first embodiment.
Figure 14:
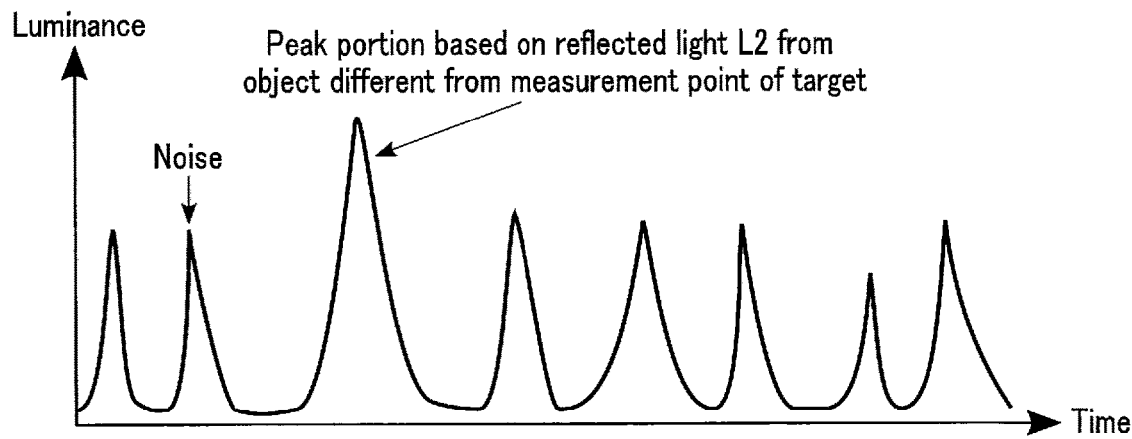

FIG. 14 depicts time charts showing an example of a light reception result for each of the target objects TG1 and TG2 in the distance measuring device 1 according to the first embodiment. Ordinate axes of the two time charts shown in FIG. 14 represent a luminance of accumulation data SD based on the light reception result. FIG. 14 (1) shows an example of accumulation data SD corresponding to the target object TG1 included in the measurement point of the target. FIG. 14 (2) shows an example of accumulation data SD corresponding to the target object TG2.

As shown in FIG. 14 (1), the accumulation data SD corresponding to the target object TG1 includes a peak portion based on the reflected light L2 and noise. On the other hand, as shown in FIG. 14 (2), the accumulation data SD corresponding to the target object TG2 can include a peak portion based on the reflected light L2 from an object different from the measurement point of the target. In addition, the peak portion included in FIG. 14 (1) and the peak portion included in FIG. 14 (2) are different in detection time and luminance intensity.

The height of the peak portion included in the accumulation data SD changes according to the intensity of the reflected light L2. For example, the intensity of the reflected light L2 changes according to a reflectance of a surface of the target object TG. Thus, it is highly likely that the reflected light L2 from different target objects TG will be detected at different times and will be different in luminance intensity. Then, similarly to the intensity of the peak portion, an intensity of noise included in the accumulation data SD can also change according to an irradiation direction of the reflected light L1.

[1-2-5] Flow of Measurement Operation

Figure 15:
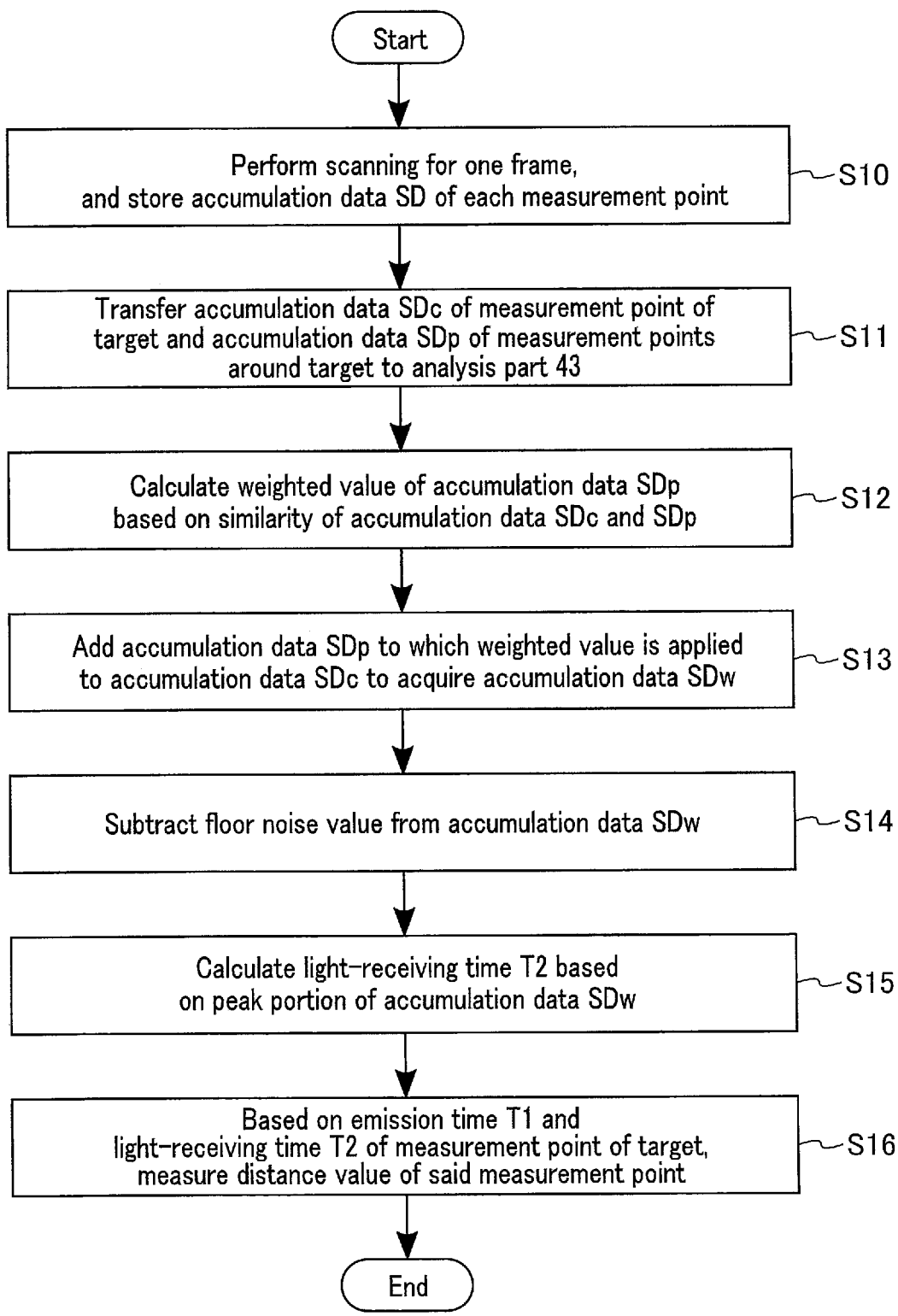
FIG. 15 depicts a flowchart showing an example of a measurement operation of the distance measuring device according to the first embodiment.

FIG. 15 depicts a flowchart showing an example of a measurement operation of the distance measuring device 1 according to the first embodiment. As shown in FIG. 15, when the measurement operation starts (Start), the distance measuring device 1 performs scanning of a region necessary for averaging, and stores accumulation data of each measurement point in the storage part 42 (S10). Then, the storage part 42 transfers accumulation data SDc of a measurement point of a target and accumulation data SDp of measurement points around the target to the analysis part 43 (S11). After that, the analysis part 43 calculates a weighted value of the accumulation data SDp based on a similarity of the accumulation data SDc and SDp (S12). Thereafter, the analysis part 43 transfers the accumulation data SDp with which the calculated weighted value is associated and the accumulation data SDc to the second accumulation part 44.

Next, the second accumulation part 44 adds the accumulation data SDp to which the weighted value is applied to the accumulation data SDc to acquire accumulation data SDw (S13). After the second accumulation part 44 acquires the accumulation data SDw, the distance measurement part 45 subtracts (deducts) a floor noise value from the accumulation data SDw (S14). Then, the distance measurement part 45 calculates the light-receiving time T2 corresponding to the outgoing light L1 of the measurement point of the target based on a peak portion of the accumulation data SDw (S15). After that, the distance measurement part 45 measures a distance value of the measurement point based on the emission time T1 and the light-receiving time T2 of the measurement point of the target (S16). As a result, the measurement of a distance value corresponding to one measurement point within one frame ends (End).

Figure 16:
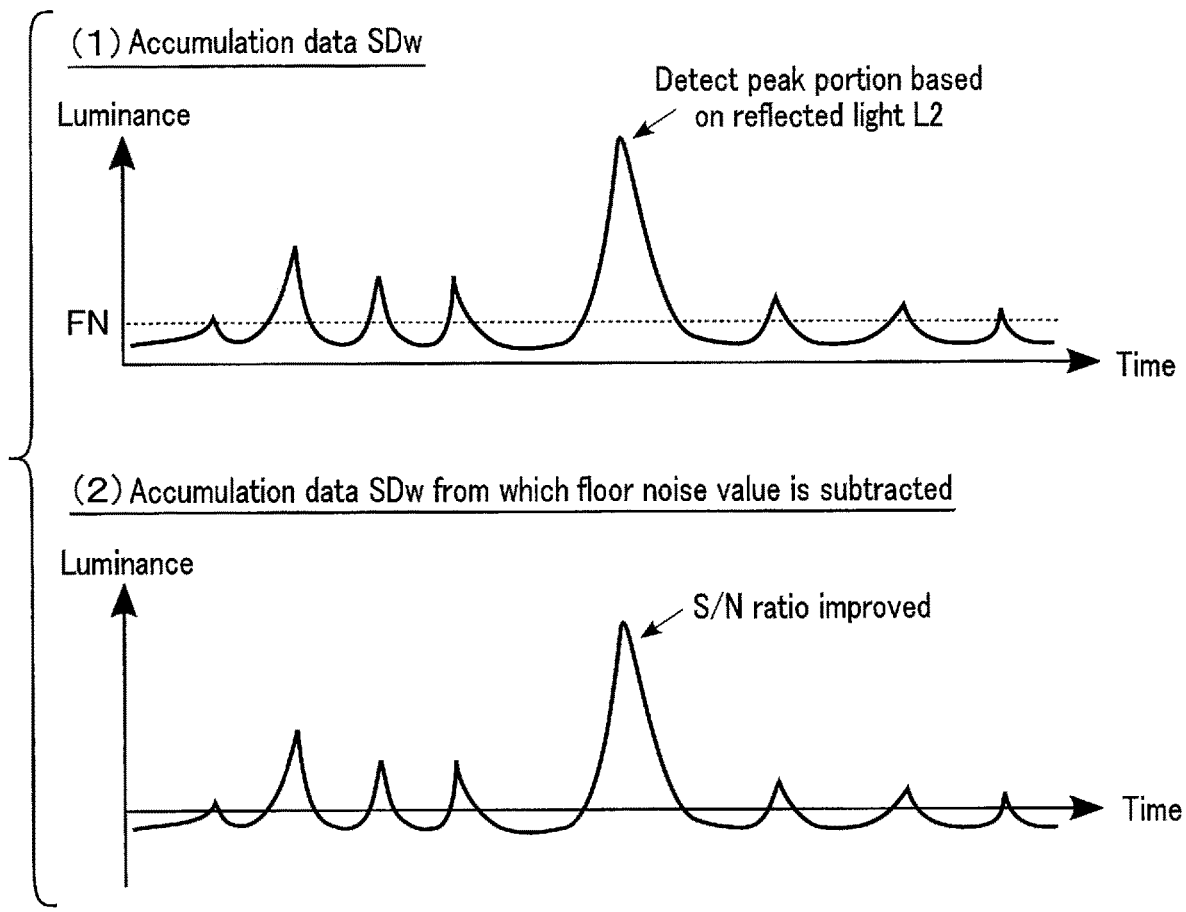
FIG. 16 depicts time charts showing an example of accumulation data in the distance measuring device according to the first embodiment.

FIG. 16 depicts time charts showing an example of accumulation data in the distance measuring device 1 according to the first embodiment. Ordinate axes of the two time charts shown in FIG. 16 represent a luminance of accumulation data SD based on the light reception result. FIG. 16 (1) shows an example of accumulation data SDw and a floor noise value FN corresponding to the accumulation data SDw. FIG. 16 (2) shows an example of the accumulation data SDw from which the floor noise value is subtracted.

As shown in FIG. 16 (1), the accumulation data SDw includes a random noise component. When the floor noise value FN is subtracted from the accumulation data SDw, the overall value of the accumulation data SDw is lowered as shown in FIG. 16 (2). As a result, in the accumulation data SDw from which the floor noise value is subtracted, an S/N ratio at the peak portion based on the reflected light L2 is improved.

In the subtraction of the floor noise value, negative numbers may be truncated. The floor noise value FN subtracted from the accumulation data SDw may be calculated using a simple average or a divided average. When the accumulation data SDw is an average value of the accumulation data SD to which a weighted value is applied within a cluster, a floor noise value calculated by the bottom portion calculator 431 may be used as the floor noise value in the process of step S14.

Figure 17:
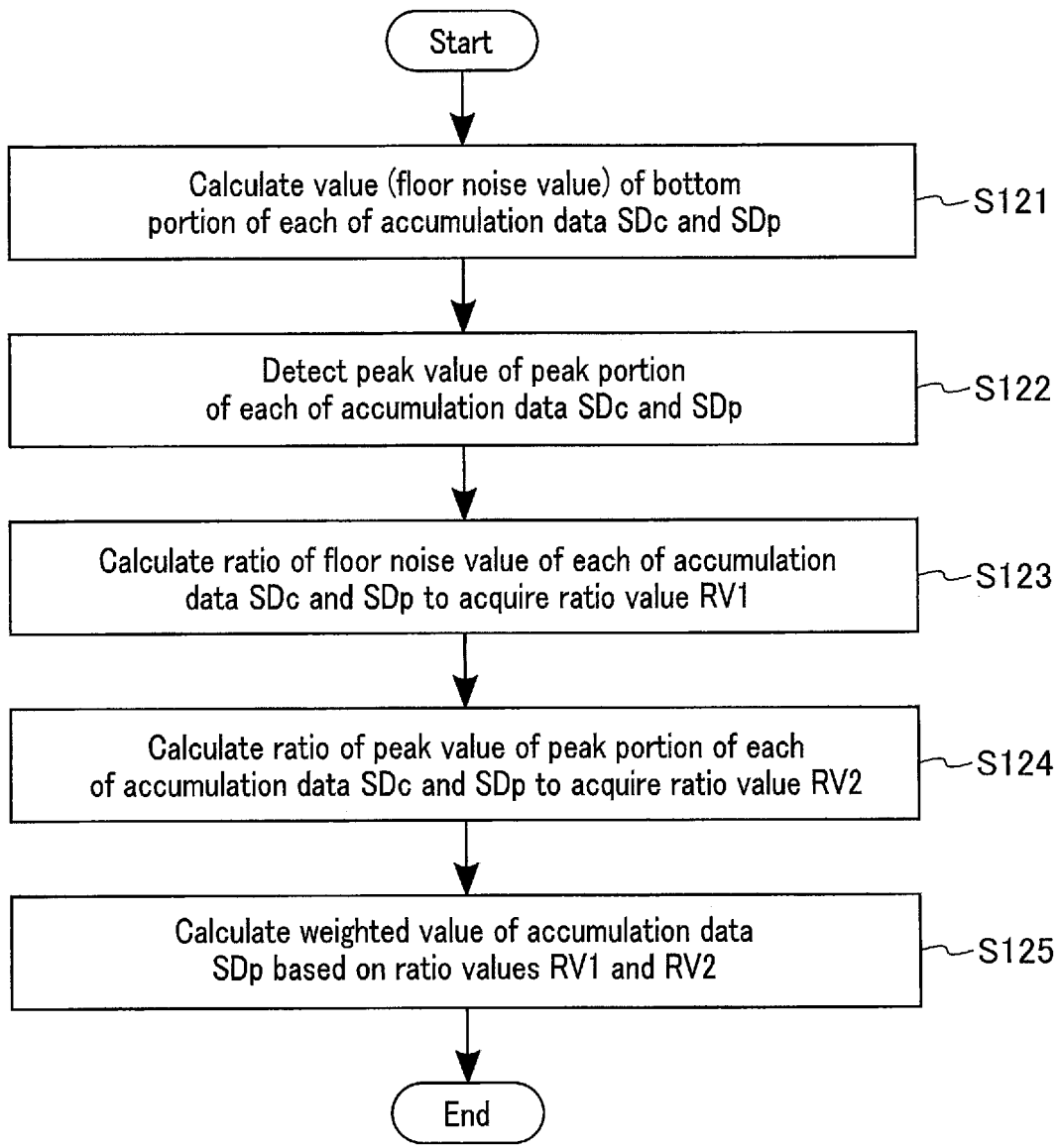
FIG. 17 depicts a flowchart showing an example of a calculation method of a weighted value in the measurement operation of the distance measuring device according to the first embodiment.

FIG. 17 depicts a flowchart showing an example of a calculation method of a weighted value in a measurement operation of the distance measuring device 1 according to the first embodiment. FIG. 17 depicts a specific example of a flow of the process of step S12. As shown in FIG. 17, when the process of step S12 starts (Start), the bottom portion calculator 431 calculates a value (i.e., a floor noise value) of a bottom portion of each of the accumulation data SDc and SDp (S121). A value of a bottom portion is, for example, a time average value of luminance in a single measurement time. In addition, the peak portion detector 432 subtracts values of corresponding bottom portions from the accumulation data SDc and SDp, and then detects peak values of respective peak portions (S122).

Next, the bottom portion calculator 431 calculates a ratio of floor noise values of the accumulation data SDc and SDp to acquire a ratio value RV1 (S123). The ratio value RV1 indicates a similarity level of floor noise values between a measurement point of a target and measurement points around the target. In addition, the peak portion detector 432 calculates a ratio of peak values of respective peak portions of the accumulation data SDc and SDp to acquire a ratio value RV2 (S124). The ratio value RV2 indicates a similarity level of the maximum intensity (peak value) of a light reception result at the measurement point of the target and the maximum intensity (peak value) of light reception results at the measurement points around the target.

Then, the weighted value generator 433 calculates a weighted value of the accumulation data SDp based on the ratio values RV1 and RV2 (S125). After that, the weighted value generator 433 transfers the accumulation data SDp with which the calculated weighted value is associated and the accumulation data SDc to the second accumulation part 44 (End). The distance measuring device 1 may calculate a weighted value based at least on a similarity level of accumulation data SDc of a measurement point of a target and accumulation data SDp of measurement points around the target. For example, for calculation of a weighted value, only one of the ratio values RV1 and RV2 may be used, and a similarity level of other portions may be used. An example of detailed processes regarding steps S123 to S125 will be described in a second embodiment.

In the present embodiment, the floor noise value is subtracted in S14 of the flow of FIG. 15; alternatively, in S12 or earlier, a floor noise value for a corresponding pixel may be subtracted from the accumulation data SDc and SDp.

[1-3] Effect of First Embodiment

As described above, the distance measuring device 1 according to the first embodiment deducts a floor noise value (intensity of ambient light) from accumulation data SDw prior to detecting a position of a peak portion of the accumulation data SDw. That is, the distance measuring device 1 according to the first embodiment eliminates a noise component included in the accumulation data SDw after calculating the accumulation data SDw using a weighted value. Thereby, as described above, an S/N ratio is improved. As a result, a ranging success rate and ranging accuracy of the distance measuring device 1 according to the first embodiment are improved.

Figure 18:
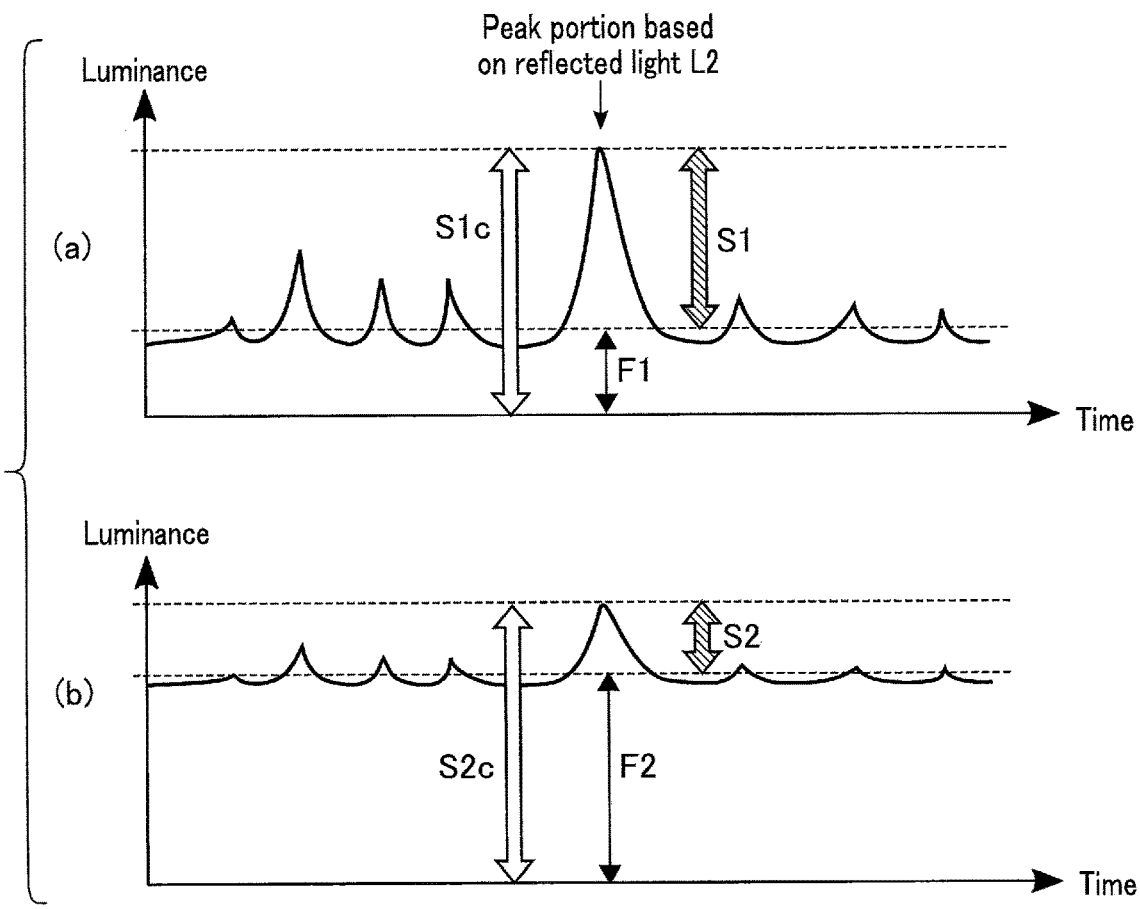
FIG. 18 depicts time charts schematically showing a difference between the first embodiment and a comparative example of the first embodiment.

The peak portion of the accumulation data SDw includes a component of floor noise in the same manner as other portions. Thus, in the accumulation data SDw, a signal value of a peak portion corresponding to the reflected light L2 becomes a correct value by a floor noise value being subtracted. FIG. 18 depicts time charts schematically showing a difference between the first embodiment and a comparative example of the first embodiment. FIGS. 18 (a) and (b) correspond to accumulation data including floor noise components F1 and F2, respectively. The floor noise component F2 is larger than the floor noise component F1. "S1$c$" and "S2$c$" are signal values in the comparative example of the first embodiment. "S1" and "S2" are signal values in the first embodiment.

The signal values S1$c$ and S2$c$ in the comparative example of the first embodiment include the floor noise components F1 and F2, respectively. On the other hand, in the signal values S1 and S2 in the first embodiment, the floor noise components F1 and F2 are eliminated, respectively. That is, the signal values from which the floor noise components F1 and F2 are eliminated correspond to correct signal values based on the reflected light L2. For example, in the comparative example of the first embodiment, "S2$c$>S1$c$", i.e., the signal value S2$c$ shown in FIG. 18 (b) is larger than the signal value S1$c$ shown in FIG. 18 (a). However, "S1>S2" is correct, i.e., the signal value S1 shown in FIG. 18 (a) is larger than the signal value S2 shown in FIG. 18 (b).

As such, in the comparative example of the first embodiment, there is a concern that the magnitude relationship of the signals may be mistaken. On the other hand, the distance measuring device 1 according to the first embodiment can correctly determine the magnitude relationship of the signals. While the determination of the magnitude relationship of the signals has been described in this example, an accurate value can be obtained by the first embodiment also for the S/N ratio, etc. in the same manner. Thereby, the distance measuring device 1 according to the first embodiment can improve the S/N ratio of the measurement. As a result, the distance measuring device 1 according to the first embodiment can improve detection accuracy of a peak portion of the reflected light L2 in the accumulation data SDw, improve measurement accuracy of a distance based on the ToF method, and improve a ranging success rate.

[1-4] Modification of First Embodiment

The distance measuring device 1 according to the first embodiment can be modified in various ways. In the following, points different from the first embodiment will be described regarding a modification of the first embodiment.

Figure 19:
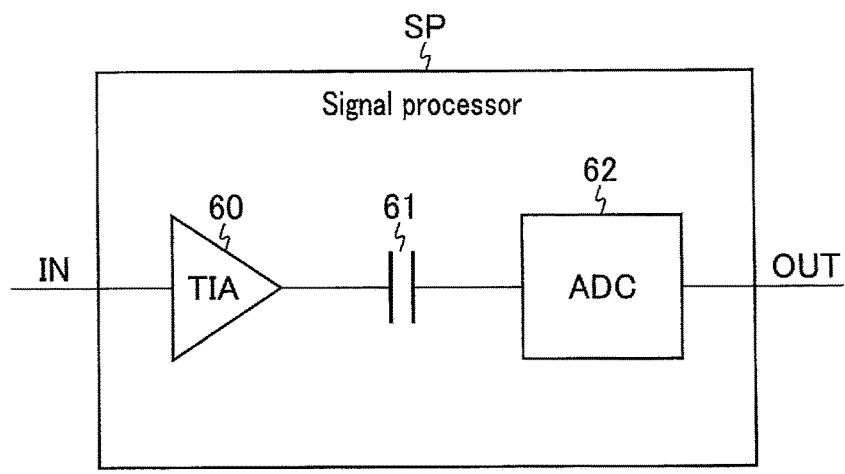
FIG. 19 depicts a block diagram showing an example of a configuration of a signal processor in a distance measuring device according to a modification of the first embodiment.

FIG. 19 depicts a block diagram showing an example of a configuration of a signal processor SP in a distance measuring device 1A according to the modification of the first embodiment. As shown in FIG. 19, the signal processor SP in the modification of the first embodiment includes, for example, an amplifier circuit 60, a capacitor 61, and an analog-to-digital converter (ADC) 62.

The amplifier circuit 60 amplifies an input electric signal. The amplifier circuit 60 is, for example, a transimpedance amplifier (TIA). To the amplifier circuit 60, for example, one type of signal IN corresponding to any one of output signals IOUTb1 to IOUTb12 is input. One of the electrodes of the capacitor 61 is coupled to the output of the amplifier circuit 60, and the other is coupled to the input of the ADC 62. The capacitor 61 eliminates a direct current component of an electric signal input from the amplifier circuit 60, and outputs it to the ADC 62. That is, the capacitor 61 forms AC coupling between the amplifier circuit 60 and the ADC 62. The ADC 62 converts an input analog electric signal into a digital electric signal. The ADC 62 outputs an output signal OUT based on the signal IN to the measurement section 40.

The above-described configuration of the signal processor SP is only an example. The signal processor SP may include a plurality of ADCs. Each configuration included in the signal processor SP may be included in the measurement section 40. In the signal processor SP, one or more ADCs may perform analog-to-digital conversion processing successively.

FIG. 20 depicts time charts showing an example of an effect of AC coupling for a light reception result of the light detector 32 in the distance measuring device 1A according to the modification of the first embodiment. Ordinate axes of the time charts of FIG. 20 represent luminance based on an output signal of a pixel PX. FIG. 20 (1) shows an example of an output (light reception result) of each pixel PX prior to the AC coupling. FIG. 20 (2) shows an example of an output of each pixel PX after the AC coupling.

As shown in FIG. 20 (1), a luminance value (voltage value) of an output of each pixel PX prior to the AC coupling fluctuates at around values equal to or above 0. In contrast, an average output voltage after the AC coupling becomes 0. Specifically, as shown in FIG. 20 (2), the output of each pixel PX prior to the AC coupling is reduced overall. Then, the average output voltage becomes 0 in an area including a noise portion and a peak portion based on the reflected light L2. The AC coupling blocks a DC component and does not transmit it to the subsequent stage. Since the DC component generally corresponds to the average value of floor noise described in the first embodiment, the output after the AC coupling corresponds to a luminance value from which the average value of floor noise is subtracted.

As a result, the distance measuring device 1A according to the modification of the first embodiment can improve the S/N ratio in an output signal after the AC coupling by deducting the floor noise. Then, the output signal with the improved S/N ratio is, for example, input to the ADC 62, and the analog-to-digital conversion described in the first embodiment is performed.

[2] Second Embodiment

A distance measuring device 2 according to a second embodiment has the same configuration as that of the distance measuring device 1 according to the first embodiment. The second embodiment relates to details of the processes of steps S123 to S125 described in the first embodiment. In the following, points different from the first embodiment will be described regarding the distance measuring device 2 according to the second embodiment.

[2-1] Operation

Figure 21:
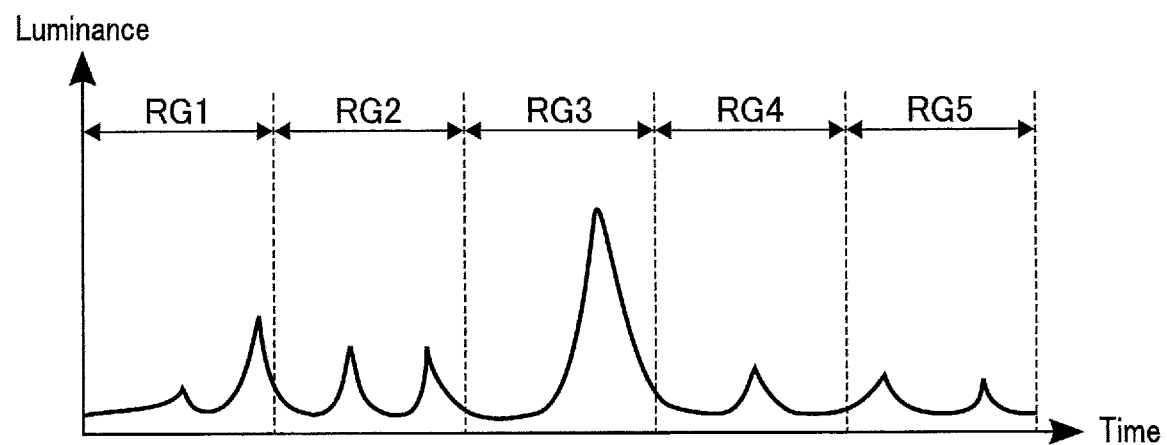
FIG. 21 depicts a time chart for explaining a calculation method of a floor noise value using a divided average in a distance measuring device according to a second embodiment.

FIG. 21 depicts a time chart for explaining a calculation method of a floor noise value using a divided average in the distance measuring device 2 according to the second embodiment. As shown in FIG. 21, the divided average may be used for calculation of the floor noise value. When the divided average is used for calculation of the floor noise value, a predetermined period within a sampling period is divided into a plurality of regions. In this example, to simplify the description, a case where the predetermined period is divided into regions RG1 to RG5 will be described. In the present embodiment, similarly to the modification of the first embodiment, the configuration of the AC coupling having the signal processor of FIG. 19 may or may not be adopted.

In the divided average, the bottom portion calculator 431 detects the minimum value and the maximum value of a signal for each of the regions RG1 to RG5. Then, the bottom portion calculator 431 calculates a difference between the maximum value and the minimum value of the signal for each of the regions RG1 to RG5. After that, the bottom portion calculator 431 calculates an average value of a difference between the maximum value and the minimum value of the signal calculated for each of the regions RG1 to RG5. The bottom portion calculator 431 handles the average value calculated in this manner as a floor noise value.

A period in which the reflected light L2 is detected corresponds to an extremely short period within the sampling period. Thus, the bottom portion calculator 431 can reduce an influence given by a signal of the reflected light L2 to the floor noise value by appropriately setting a predetermined period. The length and position of a predetermined period used for calculation of a floor noise value in a divided average can be changed according to the design of the distance measuring device 1. The bottom portion calculator 431 may set a part of or the entire sampling period as a predetermined period for calculation of a floor noise value. The number of divisions of a predetermined period in a divided average may be four or less, or six or more.

Figure 22:
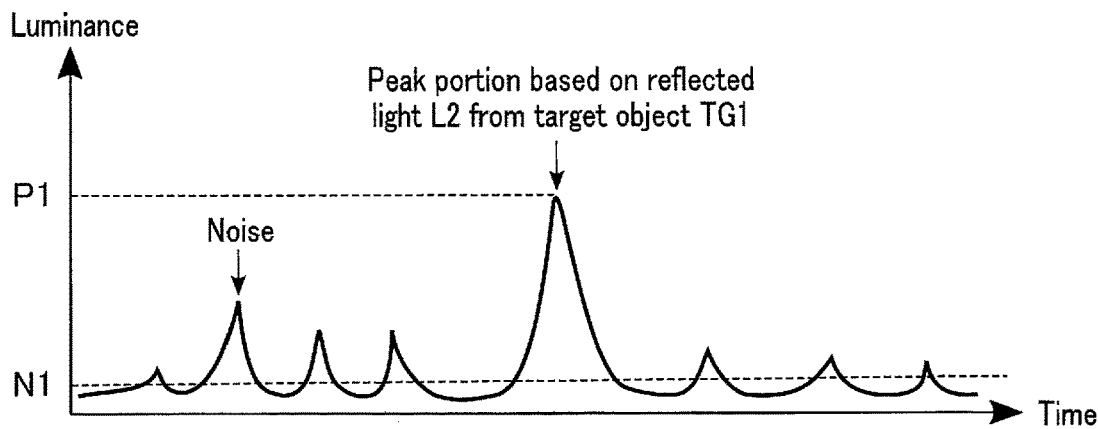
FIG. 22 depicts time charts showing an example of a light reception result of each light-receiving region in the distance measuring device according to the second embodiment.
Figure 22:
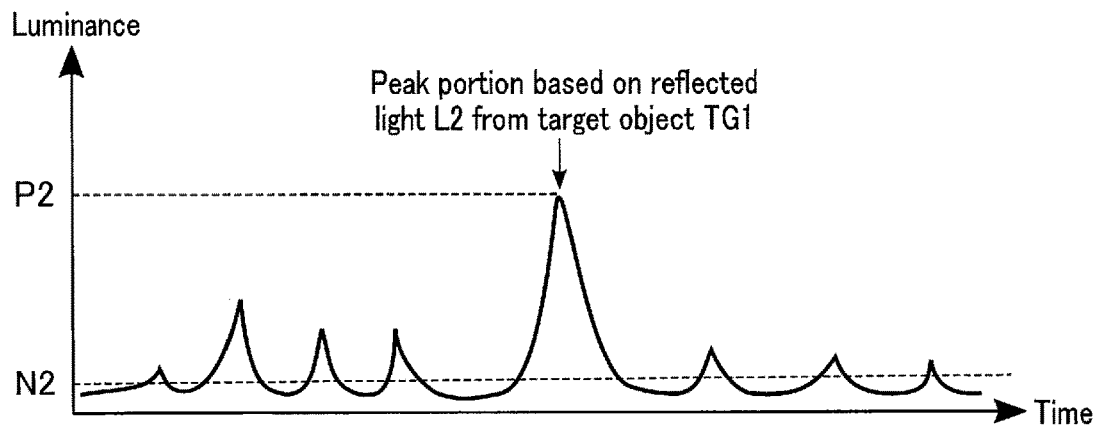
Figure 22:
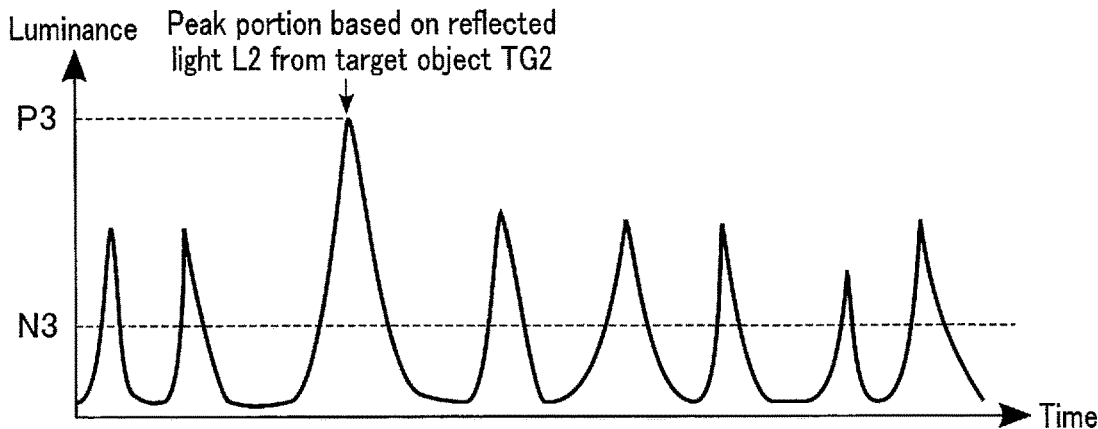

FIG. 22 depicts time charts showing an example of a light reception result of each of the regions AR to HR in the distance measuring device 1 according to the first embodiment. Ordinate axes of the three time charts shown in FIG. 22 represent luminance of the accumulation data SD based on a light reception result. FIG. 22 (1) depicts an example of the accumulation data SDc in the region ER. FIG. 22 (2) depicts an example of the accumulation data SDp in the regions AR, BR, CR, FR, and IR. FIG. 22 (3) depicts an example of the accumulation data SDp in the regions DR, GR, and HR. A peak value and a floor noise value shown in FIG. 22 (1) are referred to as "P1" and "N1", respectively. A peak value and a floor noise value shown in FIG. 22 (2) are referred to as "P2" and "N2", respectively. A peak value and a floor noise value shown in FIG. 22 (3) are referred to as "P3" and "N3".

In the example shown in FIG. 22, an absolute value of "1−(P2/P1)" is smaller than an absolute value of "1−(P3/P1)", and an absolute value of "1−(N2/N1)" is smaller than an absolute value of "1−(N3/N1)". The smaller the absolute value of "1−RV1" is, the higher the similarity of the floor noise values of the accumulation data SDc and SDp is. The smaller the absolute value of "1−RV2" is, the higher the similarity of the peak values of the accumulation data SDc and SDp is. In general, a floor noise value based on sunlight is large when it is bright, such as during daytime. In this case, it is easy for the analysis part 43 to determine whether or not targets corresponding to two pixels are identical by using a similarity index based on the floor noise value. However, the peak value is apt to pile up, and the analysis part 43 cannot determine similarity based on the piled-up value. In contrast, a floor noise value based on sunlight is small when it is dark, such as during nighttime. In this case, it is difficult for the analysis part 43 to determine similarity based on the floor noise value. On the other hand, it is difficult for the peak value to pile up, and the analysis part 43 can easily determine whether or not targets corresponding to two pixels are identical by using a similarity index based on the floor noise value. As to both a floor noise value and a peak value, when the similarity thereof is considered to be high, it is highly likely that targets corresponding to two pixels will be identical in both the bright and dark cases. Accumulation data of reflected light from different, not identical, targets is just noise. That is, the accumulation data SDc in the region ER has a high degree of similarity to the accumulation data SDp of each of the regions AR, BR, CR, ER, and IR. On the other hand, the accumulation data SDc in the region ER has a low degree of similarity to the accumulation data SDp of each of the regions DR, GR, and HR. In this case, the weighted value generator 433, for example, sets a weighted value of the accumulation data SDp acquired from each of the regions AR, BR, CR, ER, and IR to be large, and sets a weighted value of the accumulation data SDp acquired from each of the regions DR, GR, and HR to be small. Note that the higher the degree of similarity, the larger the weighted value is set, but partial exceptions can be tolerated.

FIG. 23 depicts time charts showing an example of an accumulation result using a weighted value in the distance measuring device 1 according to the first embodiment. FIGS. 23 (1) to (3) correspond to FIGS. 22 (1) to (3), respectively. FIG. 23 (4) depicts an example of the accumulation data SDw calculated by the second accumulation part 44. As shown in FIG. 23, the accumulation data SDp acquired from other regions within the area is accumulated on the accumulation data SDc acquired from the region ER.

In this example, since the degree of similarity of the accumulation data SDp acquired from each of the regions AR, BR, CR, ER, and IR is high, the accumulation data SDp acquired from each of the regions AR, BR, CR, ER, and IR is, for example, accumulated on the accumulation data SDc with a high weighted value. Since the degree of similarity of the accumulation data SDp acquired from each of the regions DR, GR, and HR is low, the accumulation data SDp acquired from each of the regions DR, GR, and HR is, for example, accumulated on the accumulation data SDc with a low weighted value.

Accumulation based on a weighted value of the accumulation data SDp with a high degree of similarity can add reflected light L2, i.e., a peak value of a signal S, from the same target, thereby increasing an S/N ratio of the reflected light L2 in the accumulation data SDw. On the other hand, accumulation based on a weighted value of the accumulation data SDp with a low degree of similarity, i.e., data which is highly likely to be noise N, gives a small change to the accumulation data SDw, thereby suppressing deterioration of the S/N ratio of the reflected light L2 in the accumulation data SDw. Then, the distance measurement part 45 detects a peak portion corresponding to the reflected light L2 from the accumulation data SDw, and calculates a light-receiving time T2 based on the peak portion. After that, the distance measurement part 45 calculates a distance value at a measurement point of a target based on an emission time T1 and the light-receiving time T2.

[2-2] Effect of Second Embodiment

As described above, the distance measurement device 2 according to the second embodiment includes the emission section 20, which performs scanning of a predetermined area while intermittently emitting laser light (outgoing light L1), the light receiver 30, which receives reflected light L2 for each outgoing light L1, and the measurement section 40, which calculates a distance from a target object TG based on a light reception result of the light receiver 30. Within the same frame, the measurement section 40 correctly eliminates an influence of floor noise from a first digital signal (accumulation data SDc) corresponding to outgoing light L1 applied from the light source 23 in the first direction and a plurality of second digital signals (accumulation data. SDp) corresponding to a plurality of beams of outgoing light L1 applied to the vicinity of the first direction, and generates weighted values of the second digital signals based on the similarity of a result after the elimination. Then, the measurement section 40 accumulates each of the second digital signals to the first digital signal based on the weighted value.

Thereby, the distance measuring device 2 according to the second embodiment can accumulate the second digital signals on the first digital signal based on the degree of similarity in a state where the floor noise is reduced. An S/N ratio of a third digital signal (accumulation data SDw) corresponding to the accumulation result is higher than that of the first digital signal. As a result, the measurement section 40 can easily detect from the third digital signal a peak portion based on reflected light L2 of outgoing light L1 applied in the first direction, and improve measurement accuracy of the light-receiving time T2. Accordingly, the distance measuring device 2 according to the second embodiment can improve measurement accuracy of a distance based on the ToF method.

[3] Third Embodiment

A distance measuring device 3 according to a third embodiment has the same configuration as that of the distance measuring device 1 according to the first embodiment. Then, the distance measuring device 3 according to the third embodiment changes an algorithm used for calculation of a floor noise value according to an intensity of ambient light. In the following, points different from the first and second embodiments will be described regarding the distance measuring device 3 according to the third embodiment.

[3-1] Operation

[3-1-1] Sensitivity of Ambient Light

Figure 24:
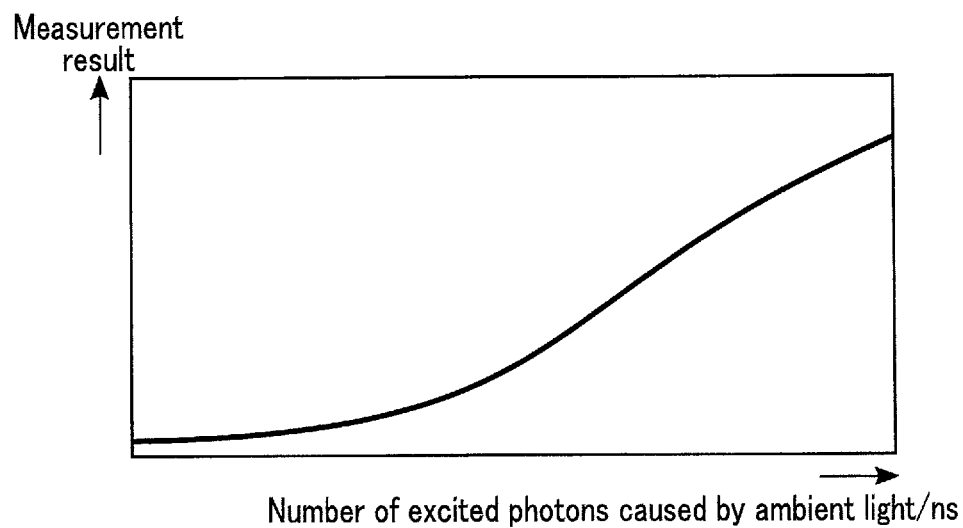
FIG. 24 depicts a graph showing an example of a change in a light reception result relative to the number of excited photons caused by ambient light in a distance measuring device according to a third embodiment.

FIG. 24 depicts a graph showing an example of a change in a light reception result of ambient light relative to the number of excited photons caused by ambient light in the distance measuring device 3 according to the third embodiment. In the graph shown in FIG. 24, the abscissa axis represents (number of excited photons caused by ambient light)/ns, and the ordinate axis represents strength of a signal corresponding to a measurement result. As shown in FIG. 24, the strength of the signal corresponding to the light reception result tends to increase monotonically as the ambient light becomes stronger.

Figure 25:
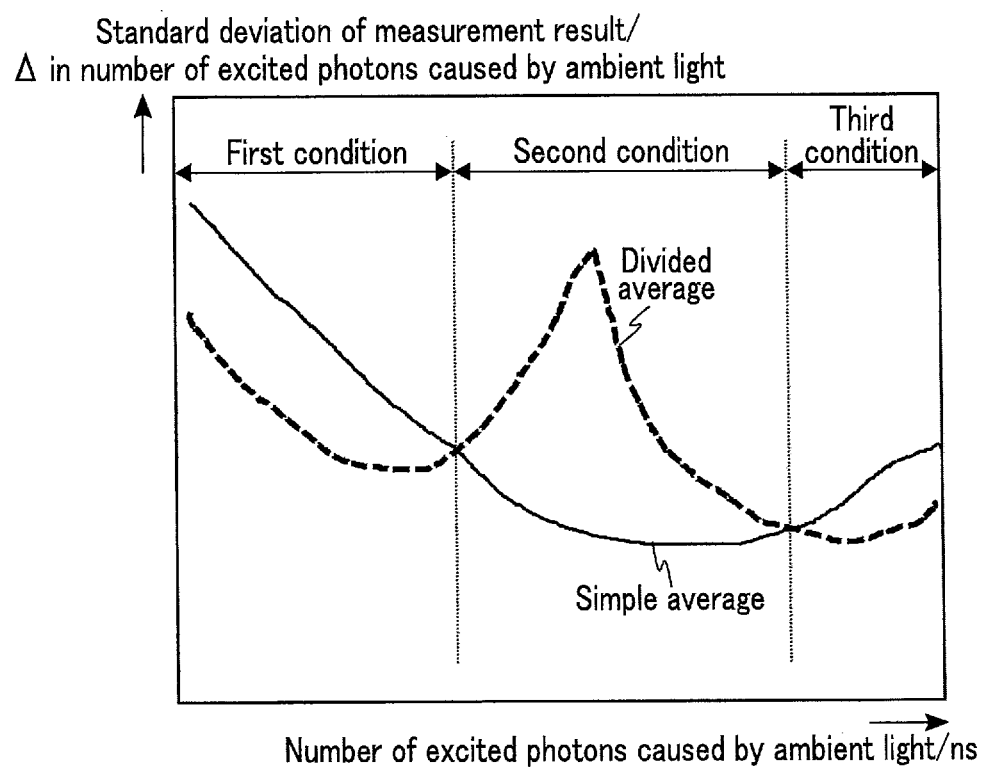
FIG. 25 depicts a graph showing an example of a change in noise value for each algorithm in the distance measuring device according to the third embodiment.

FIG. 25 depicts a graph showing an example of a change in noise value for each algorithm in the distance measuring device 3 according to the third embodiment. In the graph shown in FIG. 25, the abscissa axis represents (number of excited photons caused by ambient light)/ns, and the ordinate axis represents (standard deviation of measurement result)/($\Delta$ in number of excited photons caused by ambient light). The meaning of the graph shown in FIG. 25 represents a degree of increase in ambient light variation relative to an increase in ambient light noise, and the smaller the value on the ordinate axis the more desirable. The scale of the abscissa axis of the graph shown in FIG. 25 is the same as that of the abscissa axis of the graph shown in FIG. 24. In addition, in the graph, a thin line represents data of a simple average, and a broken line represents data of a divided average.

The data of the simple average has a concave-shaped tendency depending on (number of excited photons caused by ambient light)/ns. The data of the divided average corresponds to a standard deviation for a calculation result of the divided average under the same condition as that of the graph of FIG. 24. The data of the divided average has a convex-shaped tendency depending on (number of excited photons caused by ambient light)/ns. The data shown in FIG. 25 means that the smaller the numerical value, the easier it is to detect the target object TG. That is, the sensitivity of the target object TG when the simple average is used is deteriorated at both the large and small ends of the ambient light. The sensitivity of the target object TG when the divided average is used is better than the simple average at both the large and small ends of the ambient light.

In other words, when a first condition, a second condition, and a third condition are defined in ascending order of the intensity of the ambient light, the sensitivity of the target object TG under the first condition is better in the divided average than in the simple average. The sensitivity of the target object TG under the second condition is better in the simple average than in the divided average. The sensitivity of the target object TG under the third condition is better in the divided average than in the simple average.

When the ambient light is extremely low, the divided average corresponds to determining an extent of dark count of a SiPM sensor, and takes a value larger than a normal average value. On the other hand, in that case, an influence of ambient light noise is also larger than an estimation by the normal average value (quantum effect), and as a result, the divided average reflects an influence of the ambient light more accurately than the normal average. Further, the divided average more stably represents a change in ambient light, and for example, by using the divided average, it becomes easier to determine the similarity between pixels, etc.

On the other hand, when the ambient light is extremely strong, the pile-up becomes remarkable and the average value becomes insensitive to changes in ambient light. However, the divided average is more sensitive to changes in ambient light, and the divided average reflects an influence of the ambient light more accurately than the normal average.

[3-1-2] Selection Method of Algorithm

Figure 26:
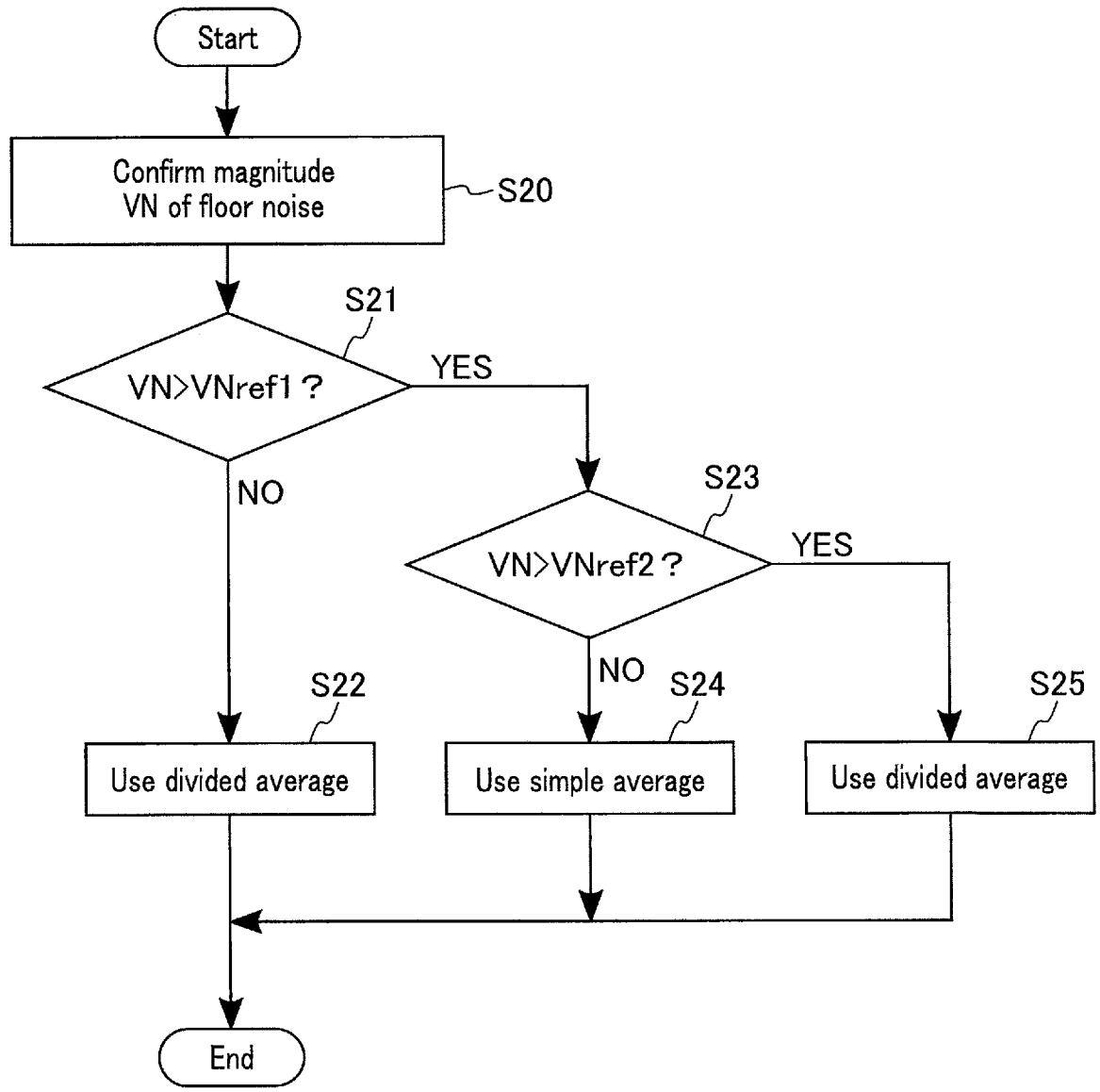
FIG. 26 depicts a flowchart showing an example of a selection method of an algorithm used for calculation of a floor noise value in a measurement operation of the distance measuring device according to the third embodiment.

FIG. 26 is a flowchart showing an example of a method of selecting an algorithm used for calculating a floor noise value in a measurement operation of the distance measuring device 3 according to the third embodiment. As shown in FIG. 26, when the measurement operation starts and the accumulation data SD is accumulated in the storage part 42 (Start), the bottom portion calculator 431 confirms a magnitude VN of floor noise (S20).

Then, the bottom portion calculator 431 confirms whether or not the VN is larger than a first threshold value VNref1 (S21). When VN>VNref1 is not satisfied (S21, NO), the bottom portion calculator 431 uses a divided average to calculate a floor noise value (S22). When VN>VNref1 is satisfied (S21, YES), the bottom portion calculator 431 subsequently confirms whether or not the VN is larger than a second threshold value VNref2 (S23). When VN>VNref2 is not satisfied (S23, NO), the bottom portion calculator 431 uses a simple average for calculating a floor noise value (S24). When VN>VNref2 is satisfied (S23, YES), the bottom portion calculator 431 uses a divided average for calculating a floor noise value (S25).

It is preferable that VNref1 be set near a boundary between the first condition and the second condition shown in FIG. 25. VNref2 is preferably set near a boundary between the second condition and the third condition shown in FIG. 25. The distance measuring device 3 according to the third embodiment may use at least two types of algorithms used for calculating a floor noise value. For example, the distance measuring device 3 may omit the case classification between the second condition and the third condition, use a divided average when the amount of ambient light corresponds to the first condition, and use a simple average when it corresponds to the second condition. The distance measuring device 3 may omit the case classification between the first condition and the second condition, use a simple average when the amount of ambient light corresponds to the second condition, and use a divided average when it corresponds to the third condition.

[3-2] Effect of Third Embodiment

In a distance measuring device, for example, in order to improve an angular resolution, it is preferable to make a pixel PX small. However, when the pixel PX becomes small, that is, when the number of SPADs included in each pixel PX becomes small, an influence of ambient light becomes large. In particular, in a 2D sensor, ranging accuracy may decrease due to deterioration of an S/N ratio caused by ambient light and signal saturation. Further, a value (floor noise value) of a magnitude of the ambient light is used, for example, for calculating the distance value described in the first embodiment. Therefore, it is preferable that measurement accuracy of the ambient light be improved.

On the other hand, the distance measuring device 3 according to the third embodiment changes an algorithm used for calculating a floor noise value according to a magnitude of a value of a bottom portion of accumulation data SD. In other words, the distance measuring device 3 according to the third embodiment selects an optimum algorithm for calculating the floor noise value according to the intensity of ambient light.

By changing the algorithm for calculating the floor noise value in this way, analysis accuracy of the accumulation data SDp is improved. That is, the distance measuring device 3 according to the third embodiment can set a floor noise value used for calculating a weighted value to an optimum value, and can improve an S/N ratio of the accumulation data SDw. As a result, the distance measuring device 3 according to the third embodiment can improve the distance measurement accuracy based on the ToF method as compared with the first embodiment.

[4] Fourth Embodiment

A distance measuring device 4 according to a fourth embodiment has the same configuration as the distance measuring device 1 according to the first embodiment. Then, the distance measuring device 4 according to the fourth embodiment calculates a distance value of a measurement point of a target by referring to accumulation data SDc based on an analysis result of accumulation data SDw. In the following, points different from the first to third embodiments will be described regarding the distance measuring device 4 according to the fourth embodiment.

[4-1] Operation

Figure 27:
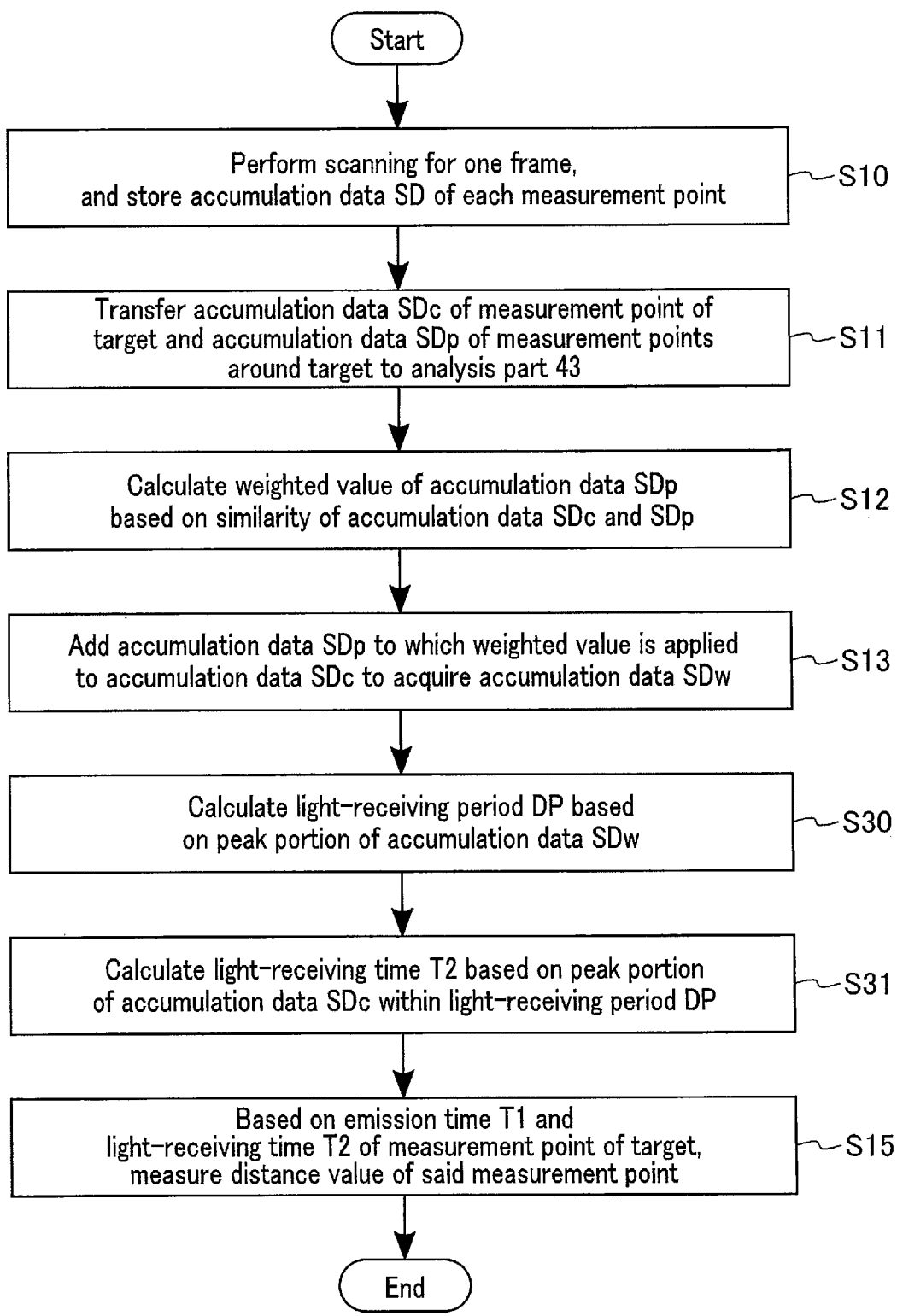
FIG. 27 depicts a flowchart showing an example of a measurement operation of a distance measuring device according to a fourth embodiment.

FIG. 27 is a flowchart showing an example of a measurement operation of the distance measuring device 4 according to the fourth embodiment. As shown in FIG. 27, the flowchart of the measurement operation in the fourth embodiment has a configuration in which step S14 of the flowchart of the measurement operation in the first embodiment is replaced with steps S30 and S31.

Specifically, after the second accumulation part 44 acquires the accumulation data SDw in the process of step S13, the distance measurement part 45 calculates a light-receiving period DP based on the peak portion of the accumulation data SDw (S30). Then, the distance measurement part 45 calculates a light-receiving time T2 based on a peak portion within the light-receiving period DP of the accumulation data SDc (S31). After that, based on an emission time T1 of the measurement point of the target and the light-receiving time T2 calculated by the process of S31, the distance measurement part 45 measures a distance value of said measurement point (S15). Other operations in the fourth embodiment are the same as those in the first embodiment.

Figure 28:
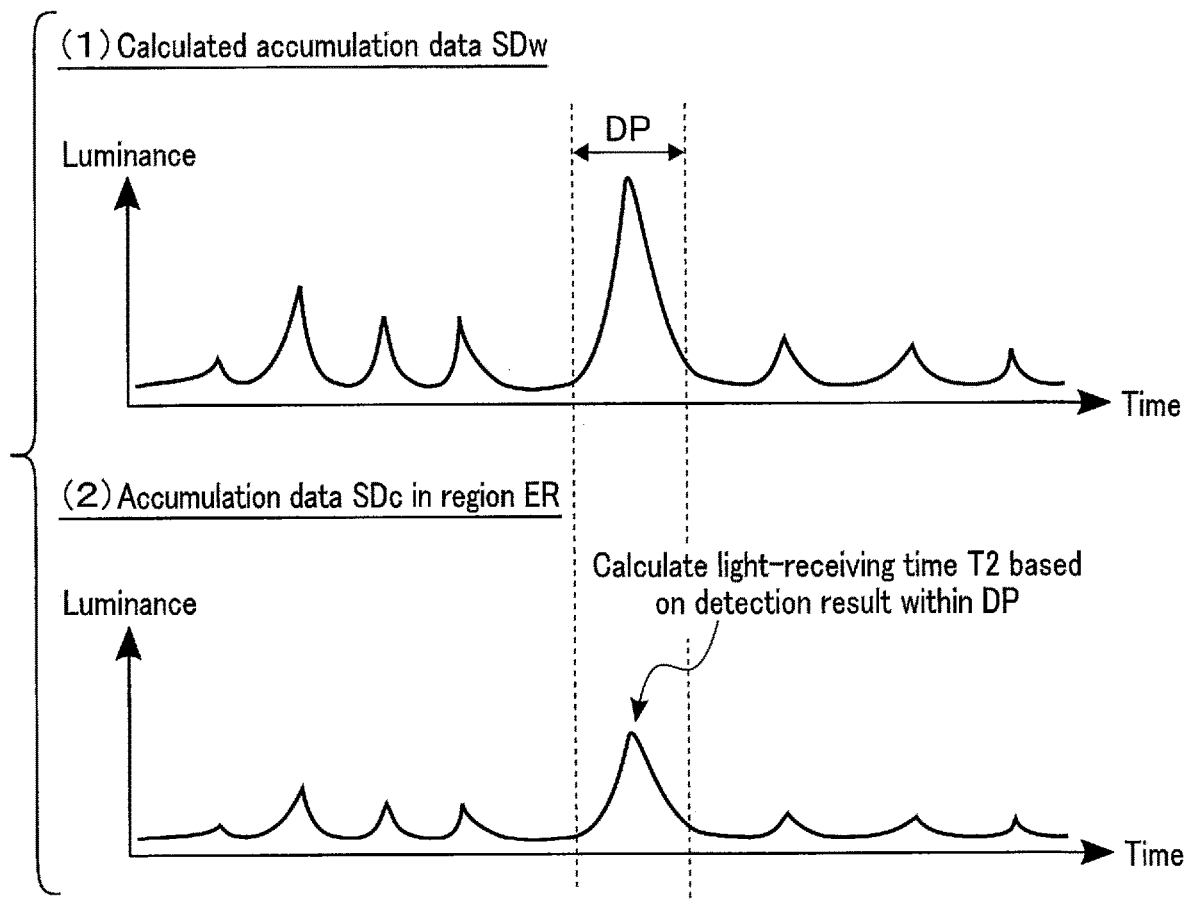
FIG. 28 depicts time charts showing an example of accumulation data in the distance measuring device according to the fourth embodiment.

FIG. 28 depicts time charts showing an example of accumulation data in the distance measuring device 4 according to the fourth embodiment. Ordinate axes of the two time charts shown in FIG. 28 represent a luminance of accumulation data SD based on the light reception result. FIG. 28 (1) shows an example of calculated accumulation data SDw. FIG. 28 (2) shows an example of accumulation data SDc associated with the accumulation data SDw.

As shown in FIG. 28 (1), for example, the peak portion detector 432 extracts a light-receiving period DP presumed to include reflected light L2 from the accumulation data SDw calculated by the second accumulation part 44. Then, as shown in FIG. 28 (2), the distance measurement part 45 refers to a portion corresponding to the light-receiving period DP in the accumulation data SDc associated with the accumulation data SDw. Then, the distance measurement part 45 calculates the light-receiving time T2 of the reflected light L2 based on a detection result (peak portion) within the light-receiving period DP. In other words, the distance measurement part 45 calculates the light-receiving time T2 from the accumulation data SDc before accumulation based on a period corresponding to the peak portion in the accumulation data SDw.

[4-2] Effect of Fourth Embodiment

As described above, the distance measuring device 4 according to the fourth embodiment detects the position of a peak portion of the accumulation data SDw, and then calculates the light-receiving time T2 from the accumulation data SDc before accumulation based on the position. Thereby, the distance measuring device 4 according to the fourth embodiment can suppress an influence of a random noise component even in the calculation of the light-receiving time T2 in the accumulation data SDc before accumulation. The distance measuring device 4 according to the fourth embodiment can measure the distance using the accumulation data SDc not including the influence of the surrounding accumulation data SDp. Therefore, when the target has a fine unevenness, the ranging result can reflect a small difference in distance that represents the unevenness. As a result, it is possible to obtain a ranging result that is more three-dimensional and has a higher resolution than that of the first embodiment.

[5] Fifth Embodiment

A distance measuring device 5 according to a fifth embodiment calculates reliability based on accumulation data SDc and SDp, and confirms a ranging result based on the calculated reliability. In the following, points different from the first to fourth embodiments will be described regarding the distance measuring device 5 according to the fifth embodiment.

[5-1] Configuration

FIG. 29 depicts a block diagram showing an example of a configuration of a measurement section 40 in the distance measuring device 5 according to the fifth embodiment. As shown in FIG. 29, the measurement section 40 in the fifth embodiment has a configuration in which a reliability generator 434 is added to the analysis part 43 of the measurement section 40 in the first embodiment.

The reliability generator 434 generates reliability based on the similarity of accumulation data SDc and SDp. The reliability generator 434 uses a first averaging algorithm or a second averaging algorithm, which will be described later, to generate the reliability. Other configurations of the distance measuring device 5 according to the fifth embodiment are the same as those of the distance measuring device 1 according to the first embodiment.

[5-2] Operation

The distance measuring device 5 according to the fifth embodiment confirms a ranging result based on reliability. Briefly, the distance measurement part 45 adopts a peak with the highest reliability from a plurality of peaks extracted from accumulation data SDw. Then, the distance measurement part 45 measures the light-receiving time T2 based on a peak portion corresponding to the adopted peak, and confirms the ranging result. First and second averaging algorithms for reliability will be described in order below.

[5-2-1] Averaging and Reliability Estimation

The first averaging algorithm selectively accumulates accumulation data by recognizing reflection data of a target using signal strength and ambient light information. An example of averaging based on the first averaging algorithm and a subsequent calculation flow of reliability will be described below.

Figure 30:
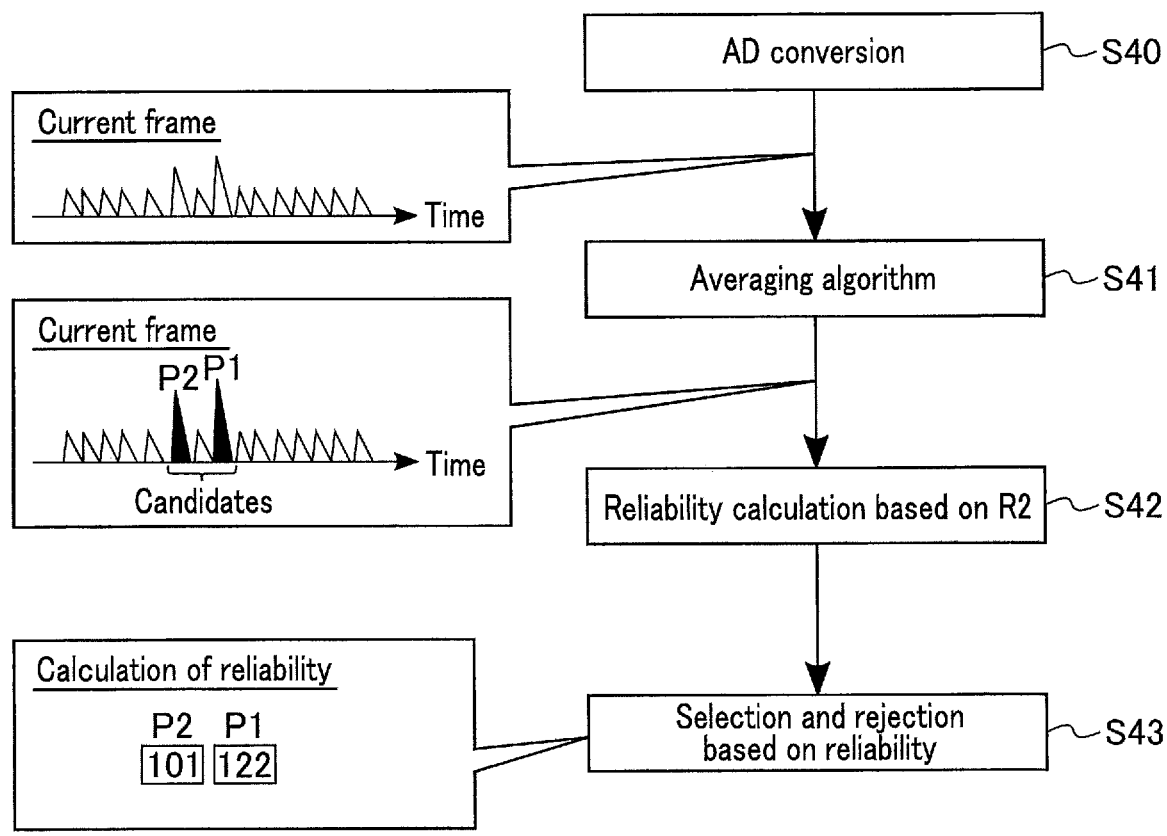
FIG. 30 depicts a schematic diagram showing an example of a calculation flow of reliability based on a first averaging algorithm of the distance measuring device according to the fifth embodiment.

FIG. 30 depicts a schematic diagram showing an example of averaging and a calculation flow of reliability of the distance measuring device 5 according to the fifth embodiment. As shown in FIG. 30, when the light receiver 30 receives the reflected light L2, the signal processor SP performs AD conversion (S40). Digital data obtained by the AD conversion is transferred to the measurement section 40, the first accumulation part 41 outputs simple accumulation data for each measurement point, and the storage part 42 stores the output simple accumulation data. Then, the analysis part 43 performs averaging processing based on an averaging algorithm (S41).

In the averaging algorithm, the peak portion detector 432 extracts peak candidates from accumulation data of a current frame. In this example, the peak portion detector 432 selects two peaks P1 and P2 as output candidates of accumulated results of the current frame. Then, the reliability generator 424 calculates reliability R2 based on R2, which will be described later, with respect to accumulation data SDw generated by the second accumulation part 44 (S42). Then, the distance measurement part 45 selects or rejects the peak of the output candidate based on the reliability R2 added to the accumulation data SDw (S43).

Formulae related to the reliability will be described below.

[Formula 1]

$$p(i,j):|D_j-D_i|\leq k \qquad (1)$$

Formula (1) is a function for determining whether or not distance data of two points are the same by using a threshold value k. "i" indicates an identifier (ID) of a measurement point of a target to be ranged. "j" indicates an ID of a measurement point other than the target within the area. p(i, j) indicates, for example, "1" if a distance between a distance value Di and a distance value Dj is equal to or less than "k", and "0" if it is greater than "k". The distance value Di corresponds to a ranging result of the measurement point of the target. The distance value Dj corresponds to a ranging result of the measurement point other than the target within a cluster. "k" is a numerical value exceeding 0, e.g., 2 meters.

[Formula 2]

$$N_i = \Sigma_{j \in A} p(i,j) \qquad (2)$$

Formula (2) is a function indicating the size of a cluster. N1 indicates the number of measurement points having the distance value Dj, a difference of which from the distance value Di of the measurement point of the target is equal to or less than a predetermined "k", among measurement points within a predetermined range A from the measurement point of the target.

[Formula 3]

$$R2_i = \left[\sum\nolimits_{j \in A} L_j^2 \times p(i,j)\right]^{1/2} \quad (3)$$

Formula (3) is a function that gives reliability R2. Reliability R2$i$ is a value based on a square mean of a signal value Lj of a measurement point considered to have a distance equal to that of the measurement point of the target among other measurement points within the predetermined range A from the measurement point of the target. The signal value Lj corresponds to a measurement point having the distance value Dj, a difference of which from the distance value Di of the measurement point of the target is equal to or less than the threshold value k.

Based on the formulae (1) to (3) described above, the reliability generator 434 calculates the reliability R2 at the measurement point of the target. In this example, the reliability R2 of the peak P1 is "122", and the reliability R2 of the peak P2 is "101". In this case, the distance measurement part 45 adapts the peak P1 with the higher reliability R2 than that of the peak P2 for measurement of the light-receiving time T2.

[5-2-2] Inter-Frame Averaging Algorithm

An inter-frame averaging algorithm defines a search window according to a distance and movement measured in the previous frame, and selects an additional output candidate from a return value (peak) detected within a window of a current frame. Then, in the inter-frame averaging algorithm, a peak is selected according to reliability R3 expanded to include information from the previous frame. In the following, an example of a calculation flow of reliability based on the inter-frame averaging algorithm will be described.

Figure 31:
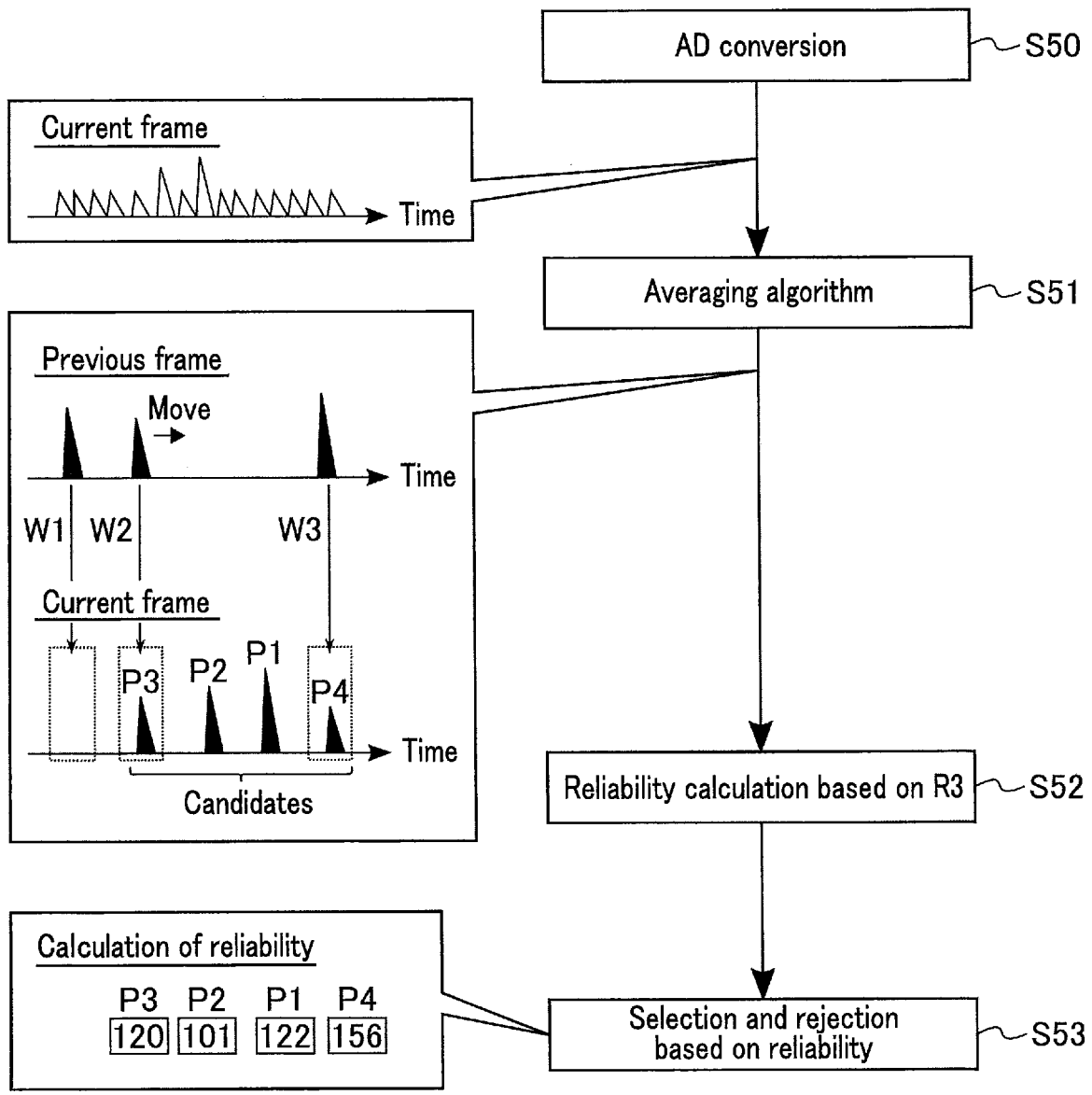
FIG. 31 depicts a schematic diagram showing an example of a calculation flow of reliability based on a second averaging algorithm of the distance measuring device according to the fifth embodiment.

FIG. 31 depicts a schematic diagram showing an example of a calculation flow of reliability based on an inter-frame averaging algorithm of the distance measuring device 5 according to the fifth embodiment. As shown in FIG. 31, when the light receiver 30 receives the reflected light L2, the signal processor SP performs AD conversion (S50). Digital data obtained by the AD conversion is transferred to the measurement section 40, and the storage part 42 stores accumulation data for each measurement point for a plurality of frames. Then, the analysis part 43 performs averaging processing based on an inter-frame averaging algorithm (S51).

In the inter-frame averaging algorithm, the peak portion detector 432 extracts candidates of peaks in accumulation data of a current frame in the same manner as the previous averaging algorithm. In this example, the peak portion detector 432 selects two peak portions P1 and P2 as output candidates of accumulated results of the current frame. Furthermore, the distance measurement part 45 defines search windows W1 to W3 based on the peak portions detected in the previous frame. For example, the distance measurement part 45 adds peak portions P3 and P4 detected within the search windows W1 to W3 in the current frame. Then, the reliability generator 434 calculates reliability based on R3 to be described later for accumulation data SDw through the inter-frame averaging algorithm (S52). After that, the distance measurement part 45 selects or rejects distance data based on the reliability added to the accumulation data (S53).

Formulae related to the inter-frame averaging algorithm will be described below.

[Formula 4]

$$R3_{i,a} = \sqrt{R2_{i,a}^2 + RP_{i,a}^2} \quad (4)$$

Formula (4) is a function for calculating the reliability R3. "i" indicates an ID of a measurement point of a target. "a" indicates an ID of a peak portion extracted in a current frame. $R2_{i,a}^2$ corresponds to the reliability R2 in the previous averaging algorithm. That is, $R2_{i,a}^2$ indicates a pure weighted value that a ranging result of the current frame gives to the reliability. $RP_{i,a}^2$ indicates a weighted value added based on a ranging result of the previous frame.

[Formula 5]

$$P_s(D_1, D_2) : |D_1 - D_2| \leq k(D_1) \quad (5)$$

Formula (5) is a function for determining whether or not two distance values are the same. "$k_s(D_1)$" corresponds to a threshold value in the inter-frame averaging algorithm, and is a function of "$D_1$". $P_s(D_1, D_2)$ indicates, for example, "1" if a distance between the distance value $D_1$ and the distance value $D_2$ is equal to or less than "$k_s(D_1)$", and "0" if greater than "$k_s(D_1)$".

[Formula 6]

$$R2_{i,a} = [\Sigma_{j \in A, b \in Ss(j)} L(j,B,N)^2 \times P_s(D(i,a,N), D(j,b,N))]^{1/2} \quad (6)$$

Formula (6) is a function for calculating the reliability R2 in the inter-frame averaging algorithm. "N" indicates an ID of a current frame. That is, "N−1" indicates an ID of the previous frame, and "N−2" indicates an ID of a frame before the previous frame. "Ss(j)" indicates a set of peak portions extracted in the current frame. "b" indicates an ID of a peak portion extracted in the previous frame.

That is, L(j,b,N) indicates luminance of an ID of a peak portion extracted in the previous frame, in the current frame. "D(i,a,N)" indicates a distance value corresponding to a measurement point of a target among peak portions extracted in the current frame. "D(j,b,N)" indicates a distance value of a peak portion with high reliability in the previous frame among the peak portions extracted in the current frame.

[Formula 7]

$$P_p(D_1, D_2, \Delta D_2) : |D_1 - D_2 - \Delta D_2| \leq k_p(D_1, D_2) \quad (7)$$

Formula (7) is a function for defining a search window. The search window is determined by a change amount $\Delta D$ of distance values acquired in two consecutive frames. For example, $\Delta D$ represents a difference in distance value between the previous frame and a frame before the previous frame. That is, $\Delta D$ represents movement (speed) of a target object TG. The lower the speed, the narrower the search window, thereby suppressing an influence of ambient light.

[Formula 8]

$$k_p(D_1, \Delta D_2) = k_s(D_1) + C1 \times D_2 \quad (8)$$

Formula (8) is a function indicating a setting condition of a search window. $k_s(D_1)$ is a threshold value calculated based on a distance value at a measurement point of a target. $C1 \times \Delta D_2$ is a numerical value obtained by multiplying a distance value at another measurement point within an area by a predetermined constant C1.

[Formula 9]

$$RP_{i,a} = [\Sigma_{j \in B} L(j,b,N-1)^2 \times P_p(D(i,a,N), D(j,b,N-1), \Delta D) \times \{1 + P_p(D(j,b,N-1), D(j,b',N-2), \Delta D)\}]^{1/2} \quad (9)$$

Formula (9) is a function for calculating a weighted value added based on a ranging result of the previous frame. "B" indicates a plurality of measurement points within an area in the previous frame. b' indicates an ID of a peak portion with high reliability extracted in a frame before the previous frame. That is, "D(j,b',N−2)" indicates a distance value of a peak portion with high reliability among peak portions extracted in a frame before the previous frame.

Based on the formulae (4) to (9) described above, the reliability generator 434 calculates the reliability R3 at the measurement point of the target. In this example, the reliabilities R3 of the peak portions P1 to P4 are "122", "101", "120", and "156", respectively. In this case, the distance measurement part 45 adopts the peak portion P4 with the higher reliability R2 than that of the other peak portions for measurement of the light-receiving time T2.

[5-3] Effect of Fifth Embodiment

As described above, by reliability being used, reflection data from a target is extracted in accumulation data SDw. That is, a peak portion that is likely to include reflected light L2 from the target is extracted in the accumulation data SDw. As a result, the distance measuring device 5 according to the fifth embodiment can improve detection accuracy of the reflected light L2 and improve distance measurement accuracy.

[6] Others

In the first embodiment, the case has been described in which the controller 10 notifies the measurement section 40 of the emission time T1 of the outgoing light L1 as an example, but the present invention is not limited thereto. The emission time T1 may be set based on the time when the outgoing light L1 is dispersed in the emission section 20 and the dispersed outgoing light. L1 is detected by a sensor provided in the light receiver 30. In this case, the emission time T1 is reported from the light receiver 30 to the measurement section 40. In addition, the distance measuring device 1 may use a coaxial optical system between the emission section 20 and the light receiver 30. In this case, the reflected light L2 is incident on the light detector 32 via the mirror 25 and the optical system 24 of the emission section 20.

The configuration of the distance measuring device 1 according to the first embodiment is just an example. For example, the signal processor SP included in the output circuit 33 may include both an ADC and a TDC. When the signal processor SP includes the ADC and TDC, a plurality of pixels PX within an active area AA may be classified into a group of pixels PX to be converted into digital signals by the ADC and a group of pixels PX to be converted into digital signals by the TDC. When AC coupling is not used, the capacitor 61 may be omitted.

The category of each configuration of the distance measuring device 1 according to the first embodiment may be other categories. The measurement section 40 may be other categories as long as it can realize the operations described in the above-described embodiments. The CPU included in the controller 10 may be other circuits. For example, in place of the CPU, a micro processing unit (MPU), etc. may be used. In addition, each of the processes described in each embodiment may be realized by dedicated hardware. Processes executed by software and processes executed by hardware may be mixed, or either one of them may exist. In each embodiment, in the flowchart used for describing the operations, the order of processes may be interchanged as far as possible, and other processes may be added.

The above-described embodiments can be combined. For example, the second embodiment can be combined with any one of the third to fifth embodiments. The third embodiment can be combined with any one of the fourth and fifth embodiments. The fourth embodiment can be combined with the fifth embodiment. Furthermore, three or more embodiments may be combined together. A distance measuring device in which a plurality of embodiments are combined can obtain the effect of each of the combined embodiments. In addition, the above-described embodiments can be applied to a Flash-type LiDAR. The Flash-type LiDAR can emit a plurality of the outgoing light L1 in multiple directions with a single light emission.

In the present specification, the "active area AA" may also be referred to as a light-receiving area. The outgoing light L1 emitted by the light source 23 into which a pulse signal is input based on control of the controller 10 may also be referred to as a pulse signal. A "pulse width" is, for example, calculated by a half-value width of a target pulse signal. A "digital signal" indicates, for example, a signal in which an output (light reception result) of the light detector 32 is analog-to-digital converted or time-to-digital converted. A "luminance" indicates the magnitude of a signal based on an output of the light detector 32, and may be replaced with other units. A set of the controller 10 and the measurement section 40 may also be referred to as a "control circuit" or a "controller". In this case, the controller of the distance measuring device 1 performs both control of each configuration relating to a measurement operation and calculation of a distance value by the measurement section 40.

In the present specification, "accumulation data SD" may also be referred to as a digital signal including a light reception result of reflected light L2. A "bottom portion of a digital signal" indicates floor noise included in the digital signal. A "value of a bottom portion" is, for example, a time average value of luminance in a single measurement time. That is, a "value of a bottom portion of a digital signal" indicates, for example, a time average value of luminance in accumulation data SD corresponding to a single measurement time. The "single measurement time" corresponds to a single sampling period. A "value of a portion protruding from a bottom portion" indicates, for example, luminance of a peak portion corresponding to a light reception result of reflected light L2 of a digital signal including the light reception result of the reflected light L2. The "value of a portion protruding from a bottom portion" is not limited to a peak value of the peak portion, and may be a value in which luminance of the peak portion is used. A "peak portion of a signal" indicates a portion with the highest luminance in a peak portion from a bottom portion of a digital signal including a light reception result.

In the present specification, a level "H" voltage is a voltage at which an N-type transistor enters an ON state when said voltage is applied to its gate, and a P-type transistor enters an OFF state when said voltage is applied to its gate. A level "L" voltage is a voltage at which an N-type transistor enters an OFF state when said voltage is applied to its gate, and a P-type transistor enters an ON state when said voltage is applied to its gate.

In the present specification, the term "couple/connect" refers to electrical coupling, and does not exclude intervention of, for example, another element. In the present specification, an "ON state" refers to a state in which the gate of a relevant transistor has a voltage equal to or greater than a threshold voltage of the transistor being applied. An "OFF state" refers to a state in which the gate of a relevant transistor has a voltage below a threshold voltage of the transistor being applied, and does not exclude, for example, a state in which a minute electric current such as a leakage current of the transistor flows.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A distance measuring device comprising:
   a light emitter including a light source configured to emit an optical signal;
   a light receiver including a light detector and an optical system, wherein the optical system is configured to guide reflected light to the light detector, and the reflected light is the optical signal emitted from the light emitter and reflected by an external object;
   a measurement section configured to calculate a distance value from the object using a first time and a second time, wherein the first time is a time at which the light source emits the optical signal, and the second time is a time at which the light detector detects the reflected light; and
   a controller configured to cause the light source to intermittently emit the optical signal, and cause the measurement section to calculate a distance value for each intermittently emitted optical signal, wherein
   the measurement section is configured to:
      receive a first digital signal and a second digital signal from the light receiver, wherein the first digital signal includes a light reception result of reflected light of a first optical signal emitted in a first direction, the first digital signal includes a first bottom portion and a first portion protruding from the first bottom portion, the second digital signal includes a light reception result of reflected light of a second optical signal emitted in a second direction different from the first direction, and the second digital signal includes a second bottom portion and a second portion protruding from the second bottom portion;
      generate a weighted value based on a degree of similarity of values of the first and second portions, or a degree of similarity of values of the first and second bottom portions;
      generate a third digital signal obtained by adding the second digital signal to the first digital signal based on the weighted value, and the third digital signal including a third bottom portion and a third portion protruding form the third bottom portion;
      calculate a distance value from an object existing in the first direction by calculating the second time associated with the first optical signal based on a position of the third portion;
      divide the first digital signal into a plurality of first periods, and the second digital signal into a plurality of second periods;
      calculate a difference between a maximum value and a minimum value in each of the first and second periods; and
      use an average value of the difference calculated in each of the first periods as the value of the first bottom portion, and an average value of the difference calculated in each of the second periods as the value of the second bottom portion.

2. The distance measuring device of claim 1, wherein the weighted value is calculated based on a ratio between the value of the first bottom portion and the value of the second bottom portion, and is set larger as a similarity between the first digital signal and the second digital signal becomes stronger.

3. The distance measuring device of claim 1, wherein the weighted value is calculated based on a ratio between a peak value of a protruding portion of the first digital signal and a peak value of a protruding portion of the second digital signal, and is set larger as a similarity between the first digital signal and the second digital signal becomes stronger.

4. The distance measuring device of claim 1, wherein the measurement section is configured to:
   extract a period including a protruding portion from the third digital signal; and
   calculate the second time associated with the first optical signal based on a position of a portion protruding from the first bottom portion within the period.

5. The distance measuring device of claim 1, wherein the light detector includes a plurality of sensors arranged two-dimensionally on a substrate,
   each of the sensors includes an avalanche photodiode and a quench element, an anode of the avalanche photodiode being coupled to a first power supply node, one end of the quench element is coupled to a second power supply node, and another end of the quench element is coupled to a cathode of the avalanche photodiode, and
   when the sensor is turned on, the controller is configured to
      apply a first voltage to the first power supply node, and apply a second voltage higher than the first voltage to the second power supply node.

6. A distance measuring device comprising:
   a light emitter including a light source configured to emit an optical signal;
   a light receiver including a light detector and an optical system, wherein the optical system is configured to guide reflected light to the light detector, and the reflected light is the optical signal emitted from the light emitter and reflected by an external object;
   a measurement section configured to calculate a distance value from the object using a first time and a second time, wherein the first time is a time at which the light source emits the optical signal, and the second time is a time at which the light detector detects the reflected light; and
   a controller configured to cause the light source to intermittently emit the optical signal, and cause the measurement section to calculate a distance value for each intermittently emitted optical signal, wherein the measurement section is configured to:
    receive a first digital signal and a second digital signal from the light receiver, wherein the first digital signal includes a light reception result of reflected light of a first optical signal emitted in a first direction, the first digital signal includes a first bottom portion and a first portion protruding from the first bottom portion, the second digital signal includes a light reception result of reflected light of a second optical signal emitted in a second direction different from the first direction, and the second digital signal includes a second bottom portion and a second portion protruding from the second bottom portion;
    generate a weighted value based on a degree of similarity of values of the first and second portions, or a degree of similarity of values of the first and second bottom portions;
    generate a third digital signal obtained by adding the second digital signal to the first digital signal based on the weighted value, and the third digital signal including a third bottom portion and a third portion protruding form the third bottom portion;
    calculate a distance value from an object existing in the first direction by calculating the second time associated with the first optical signal based on a position of the third portion;
    calculate a first average value of the first digital signal, and a second average value of the second digital signal;
    divide the first digital signal into a plurality of first periods, and the second digital signal into a plurality of second periods;
    calculate a difference between a maximum value and a minimum value in each of the f and second periods;
    calculate a third average value of the difference calculated in each of the first periods, and a fourth average value of the difference calculated in each of the second periods;
    use the third average value as the value of the first bottom portion, and the fourth average value as the value of the second bottom portion when a light amount of the first digital signal or the second digital signal is a first value; and
    use the first average value as the value of the first bottom portion, and the second average value as the value of the second bottom portion when the light amount of the first digital signal or the second digital signal is a second value larger than the first value.

7. The distance measuring device of claim 6, wherein the measurement section uses the third average value as the value of the first bottom portion, and the fourth average value as the value of the second bottom portion when the light amount of the first digital signal or the second digital signal is a third value larger than the second value.

8. The distance measuring device of claim 6, wherein the weighted value is calculated based on a ratio between the value of the first bottom portion and the value of the second bottom portion, and is set larger as a similarity between the first digital signal and the second digital signal becomes stronger.

9. The distance measuring device of claim 6, wherein the weighted value is calculated based on a ratio between a peak value of a protruding portion of the first digital signal and a peak value of a protruding portion of the second digital signal, and is set larger as a similarity between the first digital signal and the second digital signal becomes stronger.

10. The distance measuring device of claim 6, wherein the measurement section is configured to:
    extract a period including a protruding portion from the third digital signal; and
    calculate the second time associated with the first optical signal based on a position of a portion protruding from the first bottom portion within the period.

11. The distance measuring device of claim 6, wherein the light detector includes a plurality of sensors arranged two-dimensionally on a substrate,
    each of the sensors includes an avalanche photodiode and a quench element, an anode of the avalanche photodiode being coupled to a first power supply node, one end of the quench element is coupled to a second power supply node, and another end of the quench element is coupled to a cathode of the avalanche photodiode, and
    when the sensor is turned on, the controller is configured to
        apply a first voltage to the first power supply node, and apply a second voltage higher than the first voltage to the second power supply node.

12. The distance measuring device of claim 7, wherein the weighted value is calculated based on a ratio between the value of the first bottom portion and the value of the second bottom portion, and is set larger as a similarity between the first digital signal and the second digital signal becomes stronger.

13. The distance measuring device of claim 7, wherein the weighted value is calculated based on a ratio between a peak value of a protruding portion of the first digital signal and a peak value of a protruding portion of the second digital signal, and is set larger as a similarity between the first digital signal and the second digital signal becomes stronger.

14. The distance measuring device of claim 7, wherein the measurement section is configured to:
    extract a period including a protruding portion from the third digital signal; and
    calculate the second time associated with the first optical signal based on a position of a portion protruding from the first bottom portion within the period.

15. The distance measuring device of claim 7, wherein the light detector includes a plurality of sensors arranged two-dimensionally on a substrate,
    each of the sensors includes an avalanche photodiode and a quench element, an anode of the avalanche photodiode being coupled to a first power supply node, one end of the quench element is coupled to a second power supply node, and another end of the quench element is coupled to a cathode of the avalanche photodiode, and
    when the sensor is turned on, the controller is configured to
        apply a first voltage to the first power supply node, and apply a second voltage higher than the first voltage to the second power supply node.

* * * * *